(12) United States Patent
Huang et al.

(10) Patent No.: US 9,942,379 B2
(45) Date of Patent: Apr. 10, 2018

(54) WIRELESS DOCKING

(71) Applicant: QUALCOMM Incorporated, San Diego, CA (US)

(72) Inventors: Xiaolong Huang, San Diego, CA (US); Xiaodong Wang, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/668,528

(22) Filed: Nov. 5, 2012

(65) Prior Publication Data

US 2013/0145050 A1    Jun. 6, 2013

Related U.S. Application Data

(60) Provisional application No. 61/567,434, filed on Dec. 6, 2011, provisional application No. 61/568,546, filed on Dec. 8, 2011, provisional application No. 61/583,250, filed on Jan. 5, 2012.

(51) Int. Cl.
*H04M 1/725* (2006.01)
*H04W 76/02* (2009.01)
*H04W 84/12* (2009.01)

(52) U.S. Cl.
CPC ....... *H04M 1/7253* (2013.01); *H04W 76/023* (2013.01); *H04W 84/12* (2013.01)

(58) Field of Classification Search
CPC .. H04M 1/7253; H04W 76/023; H04W 84/12
See application file for complete search history.

(56) References Cited

U.S. PATENT DOCUMENTS

| 5,894,478 | A  | * | 4/1999  | Barzegar ............ H04W 88/005 |
|           |    |   |         | 370/401 |
| 8,019,883 | B1 |   | 9/2011  | Margulis |
| 8,108,455 | B2 | * | 1/2012  | Yeager et al. ................ 709/202 |
| 8,254,992 | B1 | * | 8/2012  | Ashenbrenner ....... G06F 1/1632 |
|           |    |   |         | 455/41.2 |
| 8,554,970 | B2 | * | 10/2013 | Suumaki et al. ............. 710/303 |

(Continued)

FOREIGN PATENT DOCUMENTS

| CN | 1662913 A | 8/2005 |
| CN | 1809842 A | 7/2006 |

(Continued)

OTHER PUBLICATIONS

International Search Report and Written Opinion—PCT/US2012/068043—ISA/EPO—dated Jul. 9, 2013.

(Continued)

*Primary Examiner* — Eric T Oberly
(74) *Attorney, Agent, or Firm* — The Marbury Law Group

(57) ABSTRACT

Systems, methods, and devices are disclosed that identify a first peripheral and a second peripheral, receive information from the first peripheral and the second peripheral, communicate the information received from the first peripheral to the second peripheral, and communicate the information received from the second peripheral to the first peripheral. The information communicated to the first and second peripherals allow the first and second peripherals to communicate directly with one another.

27 Claims, 17 Drawing Sheets

(56) References Cited

U.S. PATENT DOCUMENTS

| | | |
|---|---|---|
| 2002/0161844 A1* | 10/2002 | Overtoom .................... 709/208 |
| 2004/0185778 A1 | 9/2004 | Biundo et al. |
| 2005/0220134 A1* | 10/2005 | Lin ...................... H04L 12/581 |
| | | 370/437 |
| 2008/0195788 A1 | 8/2008 | Tamir et al. |
| 2009/0163139 A1* | 6/2009 | Wright-Riley ........ G06F 1/1632 |
| | | 455/39 |
| 2010/0057969 A1 | 3/2010 | Meiri et al. |
| 2010/0250704 A1* | 9/2010 | Kittel ..................... G06F 21/10 |
| | | 709/219 |
| 2010/0322213 A1 | 12/2010 | Liu et al. |
| 2011/0082940 A1* | 4/2011 | Montemurro ....... H04W 76/023 |
| | | 709/227 |
| 2011/0185087 A1* | 7/2011 | Khan ..................... G06F 13/28 |
| | | 710/14 |
| 2011/0188391 A1 | 8/2011 | Sella et al. |
| 2011/0235530 A1 | 9/2011 | Mani |
| 2011/0277022 A1* | 11/2011 | Weizman ......................... 726/7 |
| 2012/0099566 A1 | 4/2012 | Laine et al. |
| 2012/0151089 A1* | 6/2012 | Ponmudi et al. ............ 709/237 |

FOREIGN PATENT DOCUMENTS

| | | |
|---|---|---|
| CN | 101164034 A | 4/2008 |
| CN | 101536476 A | 9/2009 |
| JP | 2008283482 A | 11/2008 |
| JP | 2008306603 A | 12/2008 |
| JP | 2011509564 A | 3/2011 |
| JP | 2013507028 A | 2/2013 |
| WO | WO-2009079287 A1 | 6/2009 |
| WO | 2011039718 A1 | 4/2011 |

OTHER PUBLICATIONS

Partial International Search Report and Written Opinion—PCT/US2012/068043—ISA/EPO—dated Apr. 24, 2013.

* cited by examiner

WIRELESS DOCKING

This application claims the benefit of U.S. Provisional Application No. 61/567,434, filed Dec. 6, 2011; U.S. Provisional Application No. 61/568,546, filed Dec. 8, 2011; and U.S. Provisional Application No. 61/583,250, filed Jan. 5, 2012, the entire content each of which is incorporated herein by reference.

TECHNICAL FIELD

This disclosure relates to techniques for connections between electronic devices, and more particularly, to techniques for wireless docking.

BACKGROUND

Docking stations, which may also be referred to as "docks," are sometimes used to connect electronic devices such as laptop computers to peripherals such as monitors, keyboards, mice, printers, or other types of input or output devices. These docking stations, however, require a physical connection between the electronic device and the docking station. Additionally, information exchanges between peripherals are routed through the docking station and electronic device, which may divert resources from the docking station or the electronic device.

SUMMARY

In one example, this disclosure describes techniques for a docket system environment in which two different peripherals communicate initially with a mobile device via a wireless dock, but eventually communicate directly with one another. The mobile device may communicate receive information of the respective peripherals and communicate such information to other peripherals so as to allow the direct communication. The direct communication between peripherals may result in more efficient communication within a docking environment.

In an example, the disclosure describes a mobile device that includes a processor and a memory, coupled to the processor. The memory may store instructions causing the processor to identify a first peripheral and a second peripheral, receive information from the first peripheral and the second peripheral, communicate the information received from the first peripheral to the second peripheral, communicate the information received from the second peripheral to the first peripheral. The information communicated to the first and second peripherals allow the first and second peripherals to communicate directly with one another.

In another example, the disclosure describes a peripheral including a processor and a memory, coupled to the processor. The memory may store instructions causing the processor to identify the peripheral to a mobile device, transmit information describing the peripheral to the mobile device, receive information describing a second peripheral from the mobile device, and communicate directly with the second peripheral based on the information describing the peripheral and the information describing the second peripheral received from the mobile device.

In another example, the disclosure describes a method that includes identifying a first peripheral and a second peripheral, receiving information from the first peripheral and the second peripheral, communicating the information received from the first peripheral to the second peripheral, and communicating the information received from the second peripheral to the first peripheral. The information communicated to the first and second peripherals allow the first and second peripherals to communicate directly with one another.

In another example, the disclosure describes a method including identifying a first peripheral to a mobile device, transmitting information describing the first peripheral to the mobile device, receiving information describing a second peripheral from the mobile device, and communicating directly with the second peripheral based on the information describing the peripheral and the information describing the second peripheral received from the mobile device.

In another example, the disclosure describes a mobile device that includes means for identifying a first peripheral and a second peripheral, means for receiving information from the first peripheral and the second peripheral, means for communicating the information received from the first peripheral to the second peripheral, and means for communicating the information received from the second peripheral to the first peripheral. The information communicated to the first and second peripherals allow the first and second peripherals to communicate directly with one another.

In another example, the disclosure describes a mobile device including means for identifying a first peripheral to a mobile device, means for transmitting information describing the peripheral to the mobile device, means for receiving information describing a second peripheral from the mobile device, and means for communicating directly with the second peripheral based on the information describing the peripheral and the information describing the second peripheral received from the mobile device.

In another example, the disclosure describes a peripheral including means for identifying the peripheral to a mobile device, means for transmitting information describing the peripheral to the mobile device, means for receiving information describing a second peripheral from the mobile device, and means for communicating directly with the second peripheral based on the information describing the peripheral and the information describing the second peripheral received from the mobile device.

In another example, the disclosure describes a computer program product including a computer-readable storage medium. The computer-readable storage medium having stored thereon instructions that, when executed, cause a processor to identify a first peripheral and a second peripheral, receive information from the first peripheral and the second peripheral, communicate the information received from the first peripheral to the second peripheral, and communicate the information received from the second peripheral to the first peripheral. The information communicated to the first and second peripherals allow the first and second peripherals to communicate directly with one another.

In another example, the disclosure describes a computer program product including a computer-readable storage medium. The computer-readable storage medium having stored thereon instructions that, when executed, cause a processor to identify a first peripheral to a mobile device, transmit information describing the peripheral to the mobile device, receive information describing a second peripheral from the mobile device, and communicate directly with the second peripheral based on the information describing the peripheral and the information describing the second peripheral received from the mobile device.

In another example, the disclosure describes a mobile device including a processor, a memory, coupled to the processor. The memory storing instructions causing the processor to connect to a master docking station which is a layer 2 peer-to-peer group owner, the layer 2 peer-to-peer group including a second docking station and retrieve information from the second dock. After the mobile device retrieves the information it can directly connect to the second docking station and use a peripheral that is directly connected to the second docking station.

In another example, the disclosure describes a method including connecting to a master docking station which is a layer 2 peer-to-peer group owner, the layer 2 peer-to-peer group including a second docking station and retrieving information from the second dock. After a mobile device retrieves the information it can directly connect to the second docking station and use a peripheral that is directly connected to the second docking station.

In another example, the disclosure describes a mobile device including means for connecting to a master docking station which is a layer 2 peer-to-peer group owner, the layer 2 peer-to-peer group including a second docking station and means retrieving information from the second dock. After the mobile device retrieves the information it can directly connect to the second docking station and use a peripheral that is directly connected to the second docking station.

In another example, the disclosure describes a computer program product comprising a computer-readable storage medium. The computer-readable having stored thereon instructions that, when executed, cause a processor to connect to a master docking station which is a layer 2 peer-to-peer group owner, the layer 2 peer-to-peer group including a second docking station and retrieve information from the second dock. After a mobile device retrieves the information it can directly connect to the second docking station and use a peripheral that is directly connected to the second docking station.

The details of one or more examples are set forth in the accompanying drawings and the description below. Other features, objects, and advantages will be apparent from the description and drawings, and from the claims.

DETAILED DESCRIPTION

As described in greater detail below, this disclosure describes a wireless communication technique applicable to a docket system environment in which two different peripherals communicate initially with a mobile device via a wireless dock, but eventually communicate directly with one another. The mobile device may communicate receive information of the respective peripherals and communicate such information to other peripherals so as to allow the direct communication. The direct communication between peripherals may result in more efficient communication within a docking environment.

A wireless docking system may include three device elements: (1) a peripheral, (2) a dock, and (3) a dockee. A peripheral may be a device that is allows a user to perform various tasks such as inputting data to an electronic device, viewing data from an electronic device, hearing audio output, etc. Typical peripheral for wireless docking include a mouse, keyboard, display, microphone, speaker, data storage, projector, camera, printer, joystick, general USB hub, Ethernet cable, and others devices that may be connected to electronic devices such as personal computers, laptop computers, mobile devices, or a wide variety of other types of devices.

A docking station is a device that serves as a connectivity agent for all the peripherals it connects to. The docking station provides a mobile device, such as a laptop or mobile handset, access to peripherals connected to it. Peripherals can be connected to a docking station via wire lines, or discovered by a docking station via a wireless protocol. When there are multiple docks, a unique master docking station may be responsible for gathering the information of all docking stations and their peripherals. A mobile device comes into contact with a docking environment first through the master docking station so to learn the wireless docking environment. The mobile device may subsequently connect to a docking station over Wi-Fi peer-to-peer in order to drive the use of its peripherals.

A dockee may comprise a mobile device that relies on docking stations to drive the use of their peripherals. For example, the dockee may communicate with the docking station to access peripherals connected to the dock. The dockee may discover information about a wireless docking environment through a master dock. Additionally, the dockee may pair with each docking station individually in order to drive the use of its peripherals. The dockee may communicate with peripherals through a dock, or communicate with peripherals directly after it is informed the existence of certain peripherals by the dock.

Figure 2:
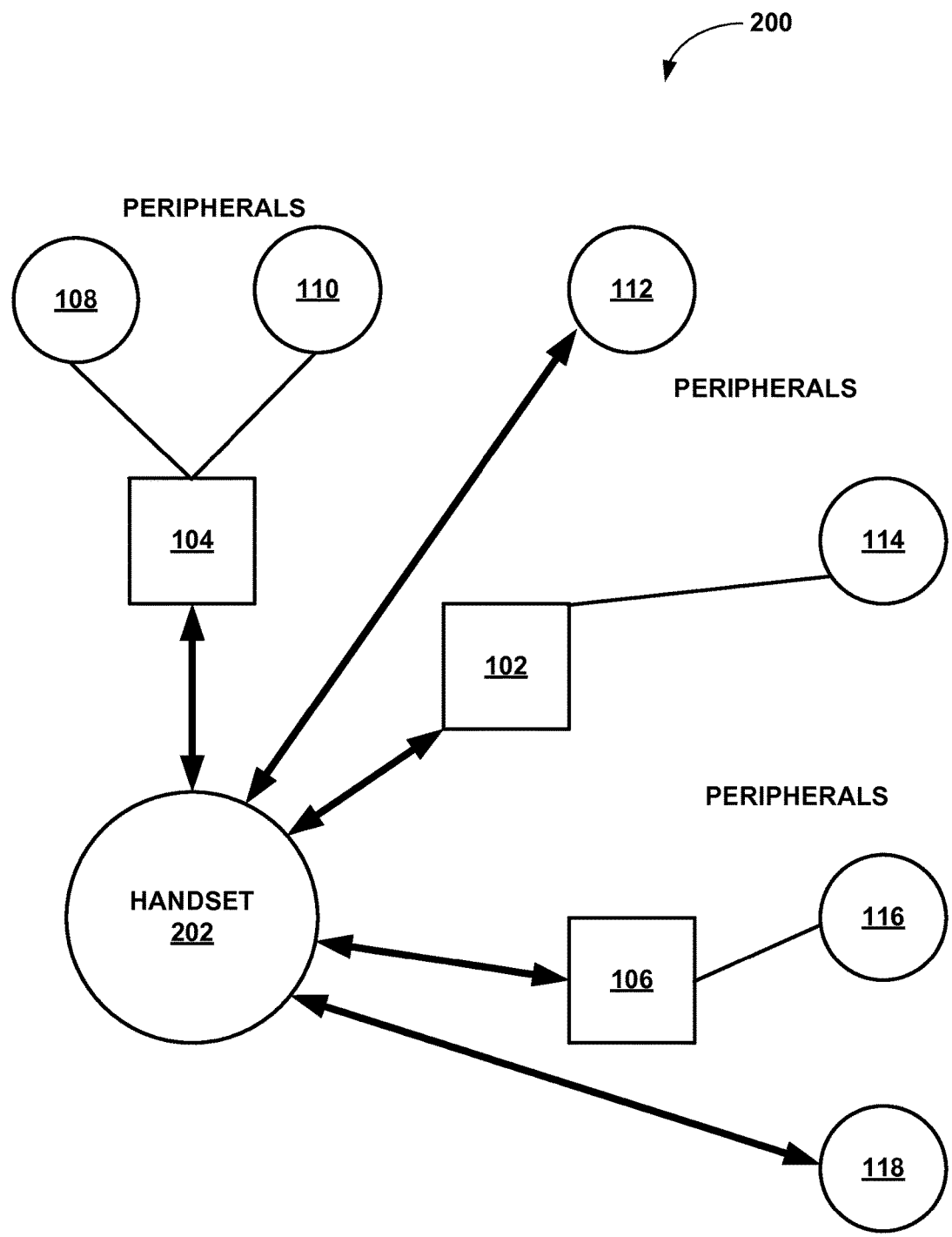
FIG. 2 is a conceptual diagram illustrating an example pairing group topology in accordance with one or more examples of this disclosure.
Figure 3:
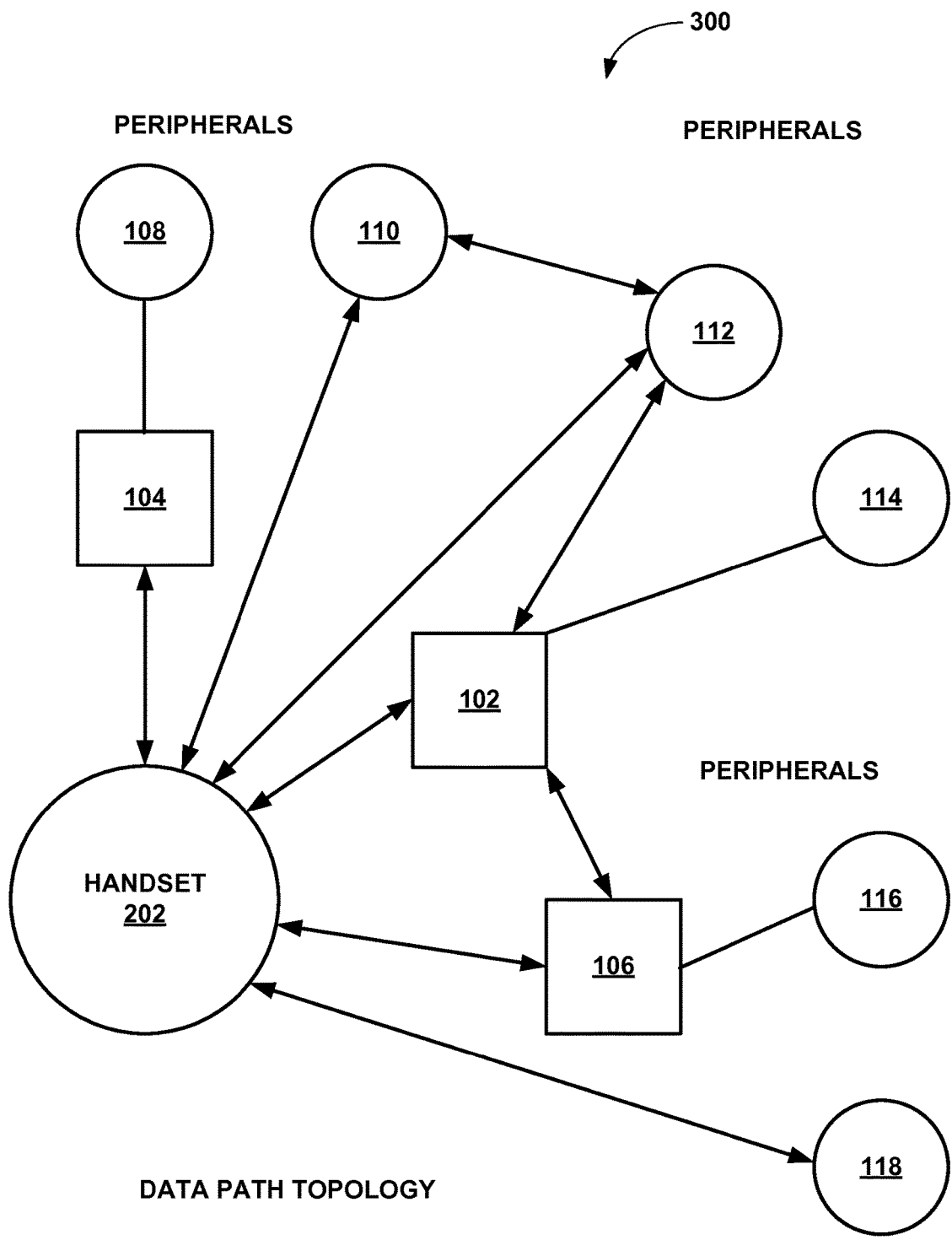
FIG. 3 is a conceptual diagram illustrating an example data path topology in accordance with one or more examples of this disclosure.

A wireless docking environment may be abstracted into three functional topologies; (1) docking station group topology, (2) pairing group topology, and (3) data plane topology. These three functional topologies are illustrated in FIG. 1, FIG. 2, FIG. 3, respectively.

Figure 1:
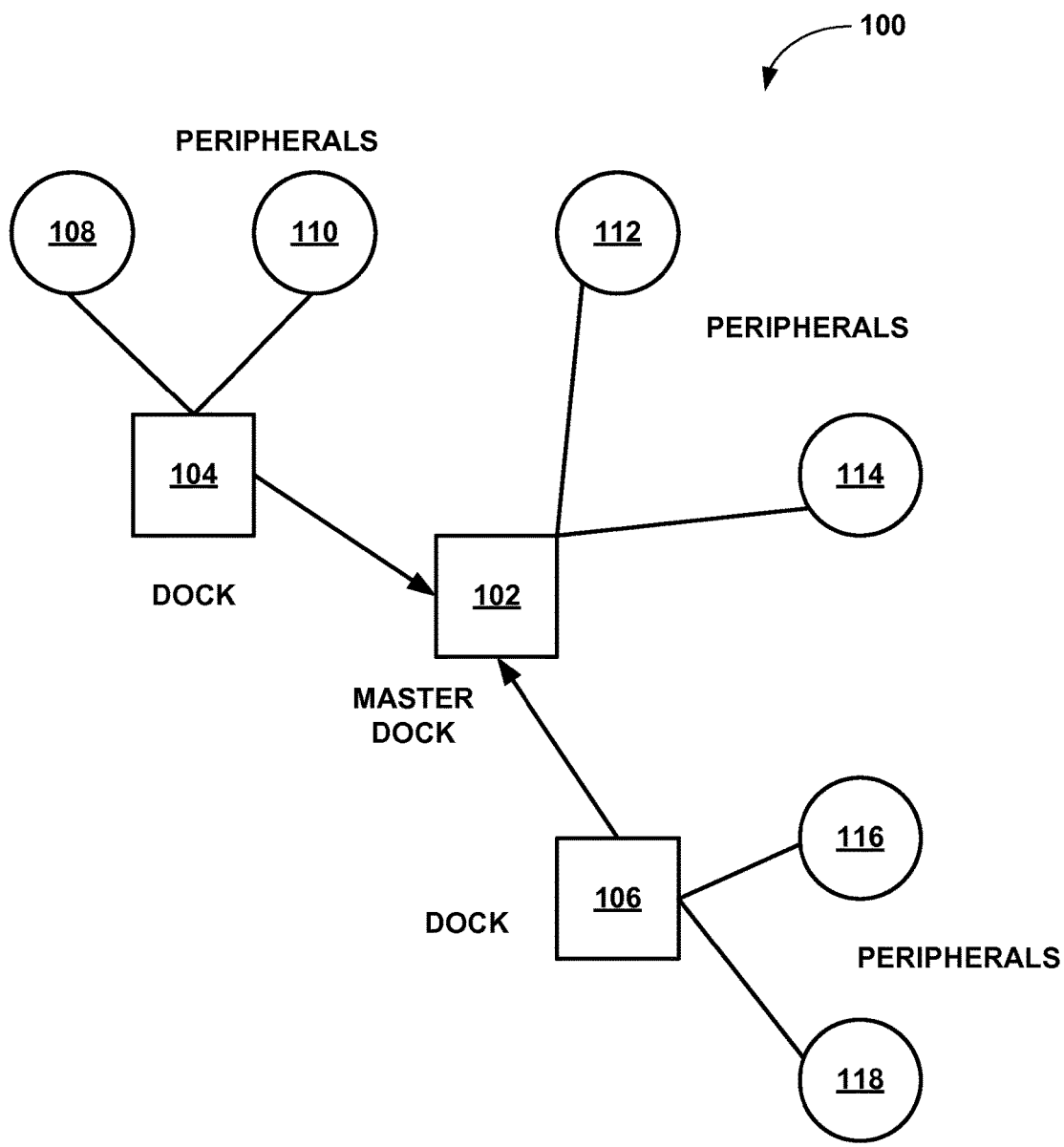
FIG. 1 is a conceptual diagram illustrating an example docking group topology in accordance with one or more examples of this disclosure.

FIG. 1 is a conceptual diagram illustrating an example docking station group topology 100 in accordance with one or more examples of this disclosure. The docking station group topology 100 illustrated in FIG. 1 shows one example relationship between multiple docking stations 102, 104, 106, including a master docking station 102 and between the docking stations 102, 104, 106 and their peripherals 108, 110, 112, 114, 116, 118 for grouping docks. In the docking station group topology 100, each docking station 102, 104, 106 may be connected to one or more peripherals 108, 110, 112, 114, 116, 118. For example, as illustrated in FIG. 1, master docking station 102 is connected to peripherals 112, 114; docking station 104 is connected to peripherals 108, 110; and docking station 106 is connected to peripherals 116, 118. Additionally, docking stations 102, 104, 106 together may form a Wi-Fi peer-to-peer group. The group owner of the Group for Docking station Grouping (GDG) may be identified as a master docking station 102. In some examples, GDG may be a Wi-Fi peer-to-peer group which might include multiple docking stations 102, 104, 106 so as to assemble docking information sets, of which the group owner may provide the docking information to a potential dockee.

All docking stations 104, 106 may give their docking information set to the master docking station 102, as illustrated in FIG. 1. The docking information set may include device address, password information, and peripheral device types for each particular docking station 104, 106. The docking set information may also include the interface technologies to be used between the docking station 102, 104, 106 and a mobile unit. The interface technologies may allow for the use of each peripheral 108, 110, 112, 114, 116, 118 through the dock. In some examples, the master docking station 102 may be responsible for advertising this docking environment and providing all docking information sets it assembles to a potential mobile unit. In some examples, communication between master docking station 102 and docking stations 104, 106 may be bi-directional.

In an example in accordance with this disclosure, a docking station 102, 104, 106, such as master docking station 102 may identify a first peripheral 112 and a second peripheral 114. Master docking station 102 may receive information from the first peripheral 112 and the second peripheral 114 and communicate the information received from the first peripheral 112 to the second peripheral 114. Master docking station 102 may also communicate the information received from the second peripheral 114 to the first peripheral 112. The information communicated to the first and second peripherals 112, 114 allow the first and second peripherals 112, 114 to communicate directly with one another. In some cases, the information communicated may cause the first and second peripherals 112, 114 to communicate directly with one another.

A wide variety of different types of information may be communicated to the first and second peripherals 112, 114 to allow or cause the first and second peripherals 112, 114 to communicate directly. Examples of such information include, but are not limited to (1) IP address, (2) port number, (3) network layer, and (4) transport layer. For examples that include a USB device the information may include (1) USB device identification and (2) USB endpoint identification. In some examples, the information communicated to the first and second peripherals 112, 114 may include (1) peripheral address, (2) peripheral identity, (3) password information, and (4) peripheral interface information. Peripheral address may be defined in the Media Access Control (MAC) layer. Peripheral identity may be defined in the docking protocol layer.

The topology illustrated in FIG. 1 may allow multiple docking stations 102, 104, 106 to form a peer-to-peer group and each docking station 102, 104, 106 may itself include several peripherals. For example, master docking station 102 and docking stations 104, 106 may form a layer 2 Wi-Fi peer-to-peer group. In the illustrated example of FIG. 1, the docking stations 104, 106 do not necessarily have access to each other 104, 106, but master docking station 102 has access to each of docking stations 104 and 106. The master docking station 102 as a Wi-Fi peer-to-peer network owner can present the entire environment to any handset or laptop that might connect to master docking station 102, as will be discussed further with respect to FIG. 2.

FIG. 2 is a conceptual diagram illustrating an example pairing group topology 200 in accordance with one or more examples of this disclosure. The pairing group topology 200 describes the relationship between a dockee, such as handset 202, and the docking stations 102, 104, 106 or their peripherals 108, 110, 112, 114, 116, 118. In an example, the devices illustrated in pairing group topology 200 may form a group for pairing, which may be a Wi-Fi peer-to-peer group which might include a dockee and multiple docking stations 102, 104, 106 so to facilitate the dockee to pair with each docking station in this peer-to-peer group, of which the group owner is the dockee.

In the pairing group topology 200, the dockee may pair wirelessly and individually with each docking station 102, 104, 106 or a peripheral 112, 118 that does not need a wireless docking station for its use. It is possible that master docking station 102 may relay the communication between the dockee and a second docking station 104, 106. For example, this might be done in case the dockee cannot pair with second docking station 104, 106 due to connectivity difficulties. Note that FIG. 2 illustrates a connection between a dockee (handset 202) and each docking station 102, 104, 106. In other words, FIG. 2 does not illustrate a specific case with connectivity difficulties. However, if for example, connectivity difficulties are experienced between handset 202 and docking station 104, master docking station 102 might provide connectivity between handset 202 and docking station 104.

In the example of FIG. 2, once master docking station 102 presents the environment to a dockee, such as handset 202, a laptop, or other dockee, the docking station group may not be important from the perspective of the dockee. Once master docking station 102 presents the environment to the dockee, the dockee will generally have the credentials of whatever devices master docking station 102 is connected too. The credentials may be related to the interface technology used. The interface technology is a protocol that specifies the format, interpretation and usage of the data sent between the dockee and a dock. Some examples of interface technology include, but are not limited to, for example, WSE in WiGig, WFD in Wi-Fi, a protocol for USB over IP, or Bluetooth to name a few.

Accordingly, the dockee may then individually connect to each docking station 102, 104, 106 directly, except in cases connectivity difficulties as discussed above. Additionally, as illustrated in FIG. 2, the dockee (e.g., handset 202) may also be connected to various peripherals 110, 112, 118 directly after receiving credentials for these devices through the master docking station 102 for example. In some examples, the dockee may have to conduct a capability negotiation phase for the interface technology with a docking station 102, 104, 106 or directly with a peripheral 110, 112, 118 in order to correctly operate with the intended peripheral.

In another example, a peripheral 214 may identify itself to a mobile device, such as handset 202. Peripheral 214 may transmit information describing itself to the mobile device and receive information describing a second peripheral 220 from the mobile device. Peripheral 214 may then communicate directly with the second peripheral 220 based on the information describing the peripheral 214 and the information describing the second peripheral 220 received from the mobile device (e.g., handset 202).

FIG. 3 is a conceptual diagram illustrating an example data path topology 300 in accordance with one or more examples of this disclosure. The data path topology 300 identifies eligible data paths among the dockee, such as handset 202, docking stations 120, 104, 106, and peripherals 108, 110, 112, 114, 116, 118. In an example, the following data paths may be eligible (1) between a dockee (e.g., handset 202) and a docking station 102, 104, 106, (2) between a dockee (e.g., handset 202) and a peripheral 110, 112, 118, (3) between two docking stations 102, 106, (4) between a peripheral 112 and a docking station 102, (5) between two peripherals 110, 112 directly, and (6) between two peripherals 112, 114 connected to a common docking station 306.

A data path between a dockee (e.g., handset 202) and a docking station 102, 104, 106 may allow for a standard data transfer (SDT). This data path may be used for delivering data wirelessly between a dockee and a peripheral 108, 114, 116, 118 on a docking station 102, 104, 106. Interface technologies used on the path may need to be supported by both the dockee and the dock. Examples of such interface technologies include, but are not limited to WSE in WiGig, WFD in Wi-Fi, a protocol for USB over IP, and Bluetooth to name a few.

A data path between a dockee (e.g., handset 202) and a peripheral 110, 112, 118 may also allow for a SDT. This path may be used for wirelessly delivering data between a dockee and a peripheral 110, 112, 118 directly. Again, interface technologies used on the path need to be supported by both the dockee and the dock, for example, WSE in WiGig, WFD in Wi-Fi, a protocol for USB over IP, Bluetooth or another wireless protocol.

A data path between two docking stations 102, 106 may also allow for a DDT. In an example, this path may be used for delivering data wirelessly between two peripherals 112, 116 on two different docking stations 102, 106 without a dockee (e.g., handset 202) otherwise being involved. The dockee needs to instruct the two docking stations to connect with each other on a common interface technology, for example, WSE in WiGig, WFD in Wi-Fi, a protocol for USB over IP to name a few.

A data path between a peripheral 112 and a docking station 102 may allow for a DDT. It may be used for delivering data wirelessly between a peripheral 112 and another peripheral 114 on the docking station 102 without a dockee (e.g., handset 202) otherwise being involved. The dockee needs to instruct the peripheral and the docking station to connect with each other on a common interface technology, for example, WSE in WiGig, WFD in Wi-Fi, a protocol for USB over IP, or Bluetooth to name a few.

A data path between two peripherals 110, 112 directly may allow for a DDT. It may be used for delivering data wirelessly between two peripherals 110, 112 directly without a dockee (e.g., handset 202) being involved. The dockee needs to instruct the two peripherals to connect with each other on a common interface technology, for example, WSE in WiGig, WFD in Wi-Fi, a protocol for USB over IP, or Bluetooth to name a few.

A data path between two peripherals 112, 114 connected to a common docking station 102 may allow for a DDT. The dockee (e.g., handset 202) may need to instruct the common docking station 202 to delivery data between two peripherals 112, 114 without the dockee otherwise being involved.

As the data paths in FIG. 3 illustrate, once handset 202 is connected to the devices of docking station group topology 100, data can flow between handset 202 and the devices. As illustrated, various pair links are possible and data may be allowed to transfer between two peripherals 110, 112 because the handset has the credentials of both peripherals 110, 112.

To further illustrate this concept, assume that peripheral 110 is a camera and peripheral 112 is a display. Initially, the camera may communicate with the display through handset 202. It may be preferable, however, for the camera to communicate directly with the display.

Handset 202 may enable a direct communication between the camera the display, for example, after handset 202 reviews the credentials for each peripheral 110 (camera) and 112 (display). Handset 202 may initially be the focal point of the connection. It may be necessary for a pairing between the camera and the display to occur via handset 202 because for example a camera and display may not allow for entry of credential information, e.g., login name and password information. Accordingly, if such a pairing is to be accomplished, it may be advantageous for handset 202 to facilitate the pairing between the camera and the display. Accordingly, in this case, handset 202 instructs the camera to send data to display device. This may streamline communication between the camera and the display. For example, using a direct communication between the camera and the display rather than a communication through handset 202 may decrease the use processing resources at the handset 202. Additionally, bandwidth consumption may also be reduced because instead of having one communication from the camera to the mobile device and another communication from the mobile device to the display, a single communication may be set up directly between the camera and the display device. This process may be seamless to the user, since the mobile device can set up the communication between the camera and the display without requiring any input from the user in some examples.

In an example in accordance with this disclosure, a mobile device such as handset 202 may identify a first peripheral 110 and a second peripheral 112. The mobile device may receive information from the first peripheral 110 and the second peripheral 112 and communicate the information received from the first peripheral 110 to the second peripheral 112. The mobile device may also communicate the information received from the second peripheral 112 to the first peripheral 110. The information communicated to the first and second peripherals 110, 112 allow the first and second peripherals 110, 112 to communicate directly with one another. In some cases, the information communicated may cause the first and second peripherals 112, 114 to communicate directly with one another.

Figure 4:
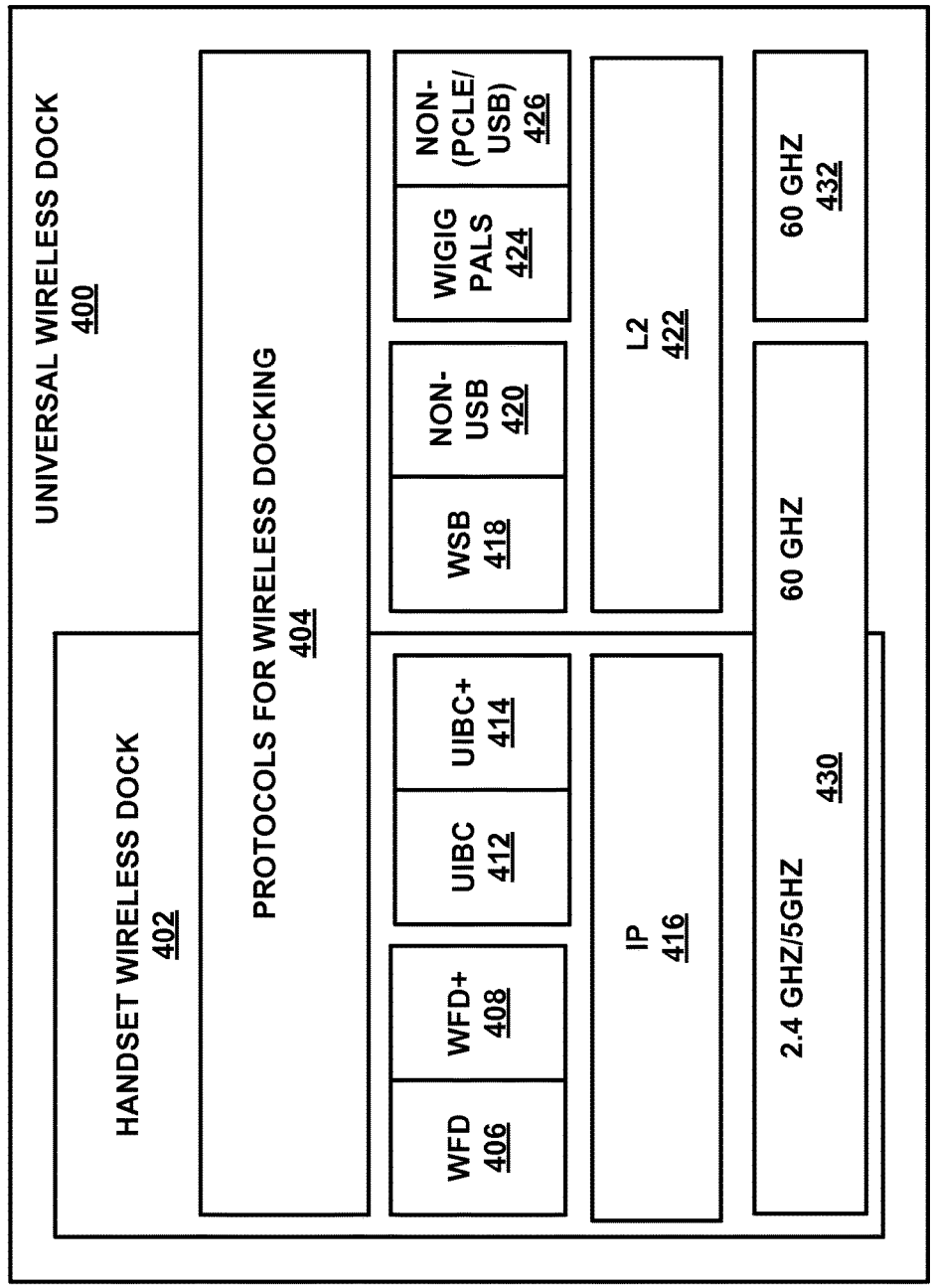
FIG. 4 is a block diagram illustrating an example of wireless docking in accordance with one or more examples of this disclosure.

FIG. 4 is a block diagram illustrating an example of wireless docking in accordance with one or more examples of this disclosure. A universal wireless dock 400 may include a handset wireless dock 402. Universal wireless dock 400 and handset wireless 402 may both include protocols for wireless docking 404, which may include device discovery, service discovery, group formation, pairing, and capability negotiation.

Various example interface technologies 406, 408, 412, 414, 418, 420, 424, 426 are illustrated in FIG. 4. An interface technology specifies the format, interpretation and usage of the data sent between the dockee and a dock. Examples of interface technology include Wireless Fidelity (Wi-Fi) Display (WFD) 406 and WFD+ 408, User Input Back Channel (UIBC) 412 and UIBC+ which may be used, for example, as protocols over IP 416. Additional examples of interface technology include Wireless Access Protocol (WAP) Service Broker (WSB) 418, Non-USB 420, WiGig PALS 424, and Non-PCLE/USB 426 which may communicate at layer 2 422. The use of each peripheral may be identified with and associated with an interface technology. In some examples, a dockee may have to go through a capability negotiation phase for the interface technology with a dock or directly with a peripheral so to correctly operate with the intended peripheral.

The wireless docking technology can include diverse physical layer technologies including Wi-Fi and WiGig that operate on 2.4 GHz, 5 GHz, and 60 GHz, as illustrated in blocks 430, 432. The wireless docking protocol 404 can run on top of IP layer 416 or within Layer 2 (L2) 422. In some examples, an interface technology may run on top of IP layer 416 or may run with its own Protocol Adaptation Layer (PAL) directly on top of Layer 2 in the OSI model (L2) 422. It will be understood that these are example components that may be included in a universal wireless dock 400. Some examples may include fewer components and other examples may include additional components not illustrated in FIG. 4.

Some examples might not include docking station grouping. Additionally, in some examples, no master docking station is used to assemble a docking environment. Each docking station may present its peripherals on its own. For example, a handset may "see" multiple docking environments and individually docking stations with each wireless dock. Each docking station assumes the role of the WSC registrar for its own environment.

Universal wireless dock 400 may use a capability negotiation. For example, RTSP transactions may be used to establish a bidirectional TCP/IP data transport for USB/IP. Such a system may include data transport. For example, a USB Request Blocks (URBs) are sent from the handset to the docking station using the designated TCP/IP transport. The docking station uses a USB transaction engine to execute USB transactions and obtains data from its USB peripherals. USB data may be sent from the docking station to the handset the designated TCP/IP transport.

In some examples, protocols for wireless docking may include three major procedures (1) docking station group forming and advertising procedure, (2) pairing procedures, and (3) DDT instruction procedures. The system illustrated in FIGS. 1-3 may use one or more of these protocols to provide for wireless docking in accordance with the systems and methods described in this disclosure. The docking station group forming may be used for forming a docking environment and advertise to a dockee. The pairing procedure may be used for a dockee to pair with docking stations and individual peripherals. The DDT instruction procedure may be used for a dockee to instruct a direct data transfer between docking stations and peripherals.

The three protocols for wireless docking (1) docking station group forming and advertising procedure, (2) pairing procedures, and (3) DDT instruction procedures are illustrated in FIGS. 5A-7C respectively. Using such protocols, various systems may form connections between a dockee (e.g., a mobile device) docks, and peripherals. A mobile device may include a processor and a memory, coupled to the processor. The memory may store instructions causing the processor to: (1) identify a first peripheral and a second peripheral, (2) receive information from the first peripheral and the second peripheral, (3) communicate the information received from the first peripheral to the second peripheral, and (4) communicate the information received from the second peripheral to the first peripheral. The information communicated to the first and second peripherals allow the first and second peripherals to communicate directly with one another. In some examples, the information communicated may cause the first and second peripherals 112, 114 to communicate directly with one another.

In another example, a peripheral may include a processor and a memory, coupled to the processor. The memory may store instructions causing the processor to: (1) identify the peripheral to a mobile device, (2) transmit information describing the peripheral to the mobile device, (3) receive information describing a second peripheral from the mobile device, and (4) communicate directly with the second peripheral based on the information describing the peripheral and the information describing the second peripheral received from the mobile device.

In another example, a mobile device includes a processor and a memory, coupled to the processor. The memory may store instructions causing the processor to (1) connect to a master docking station which is a layer 2 peer-to-peer group owner, the layer 2 peer-to-peer group including a second docking station and (2) retrieve information from the second dock. After the mobile device retrieves the information it can directly connect to the second docking station and use a peripheral that is directly connected to the second docking station.

Figure 5A:
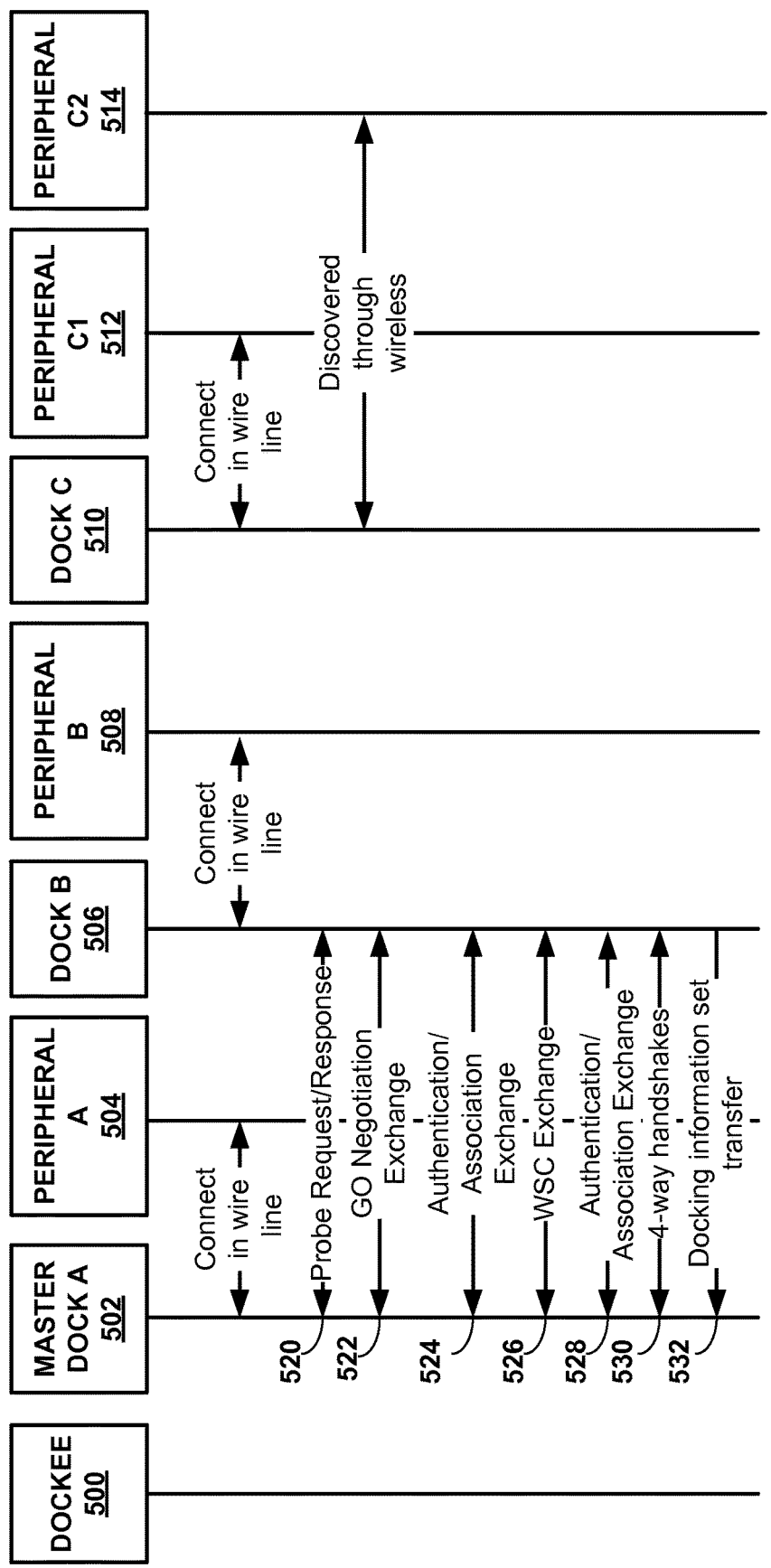
FIGS. 5A-5C are communication diagrams illustrating an example docking station group forming and advertising procedure in accordance with one or more examples of this disclosure.
Figure 5B:
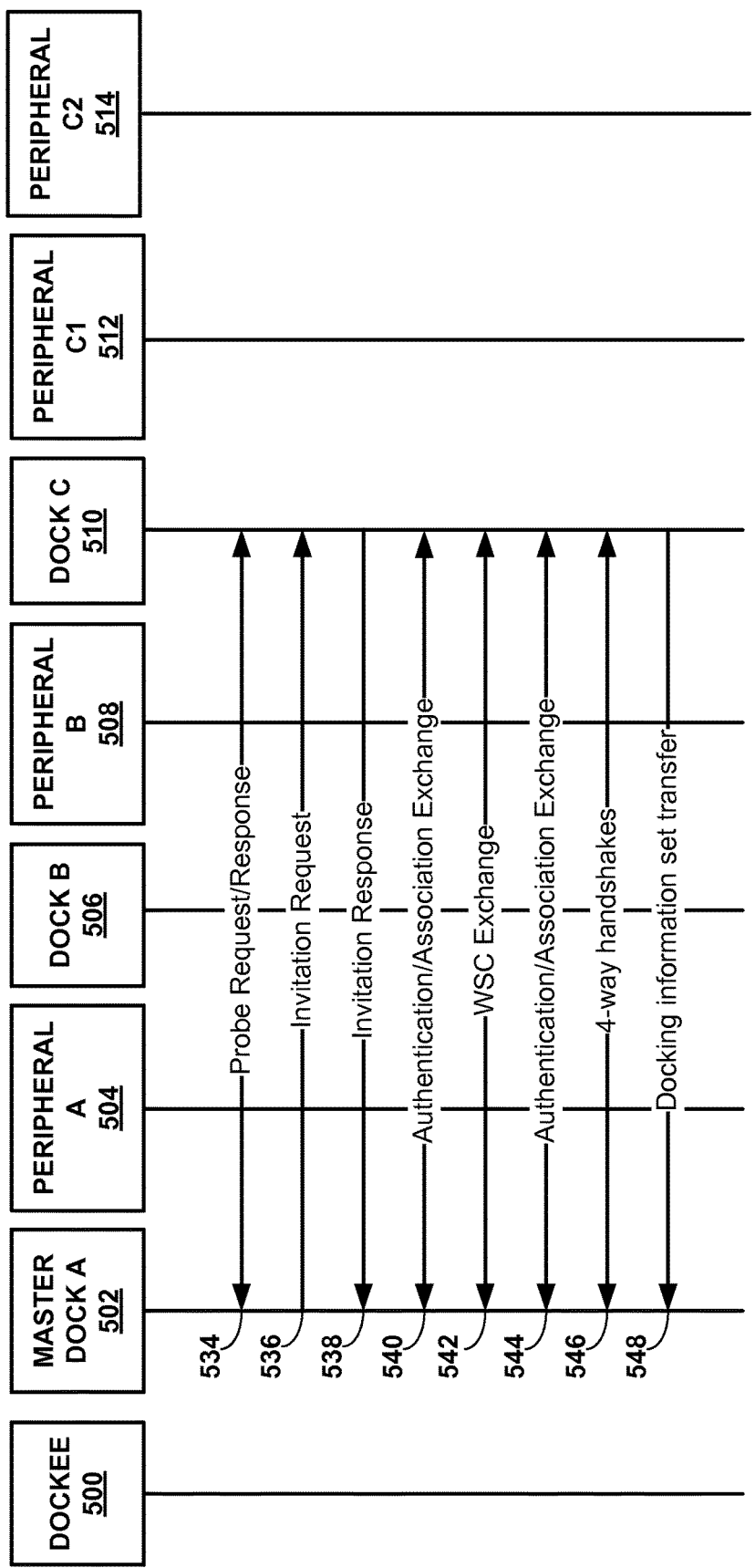
Figure 5C:
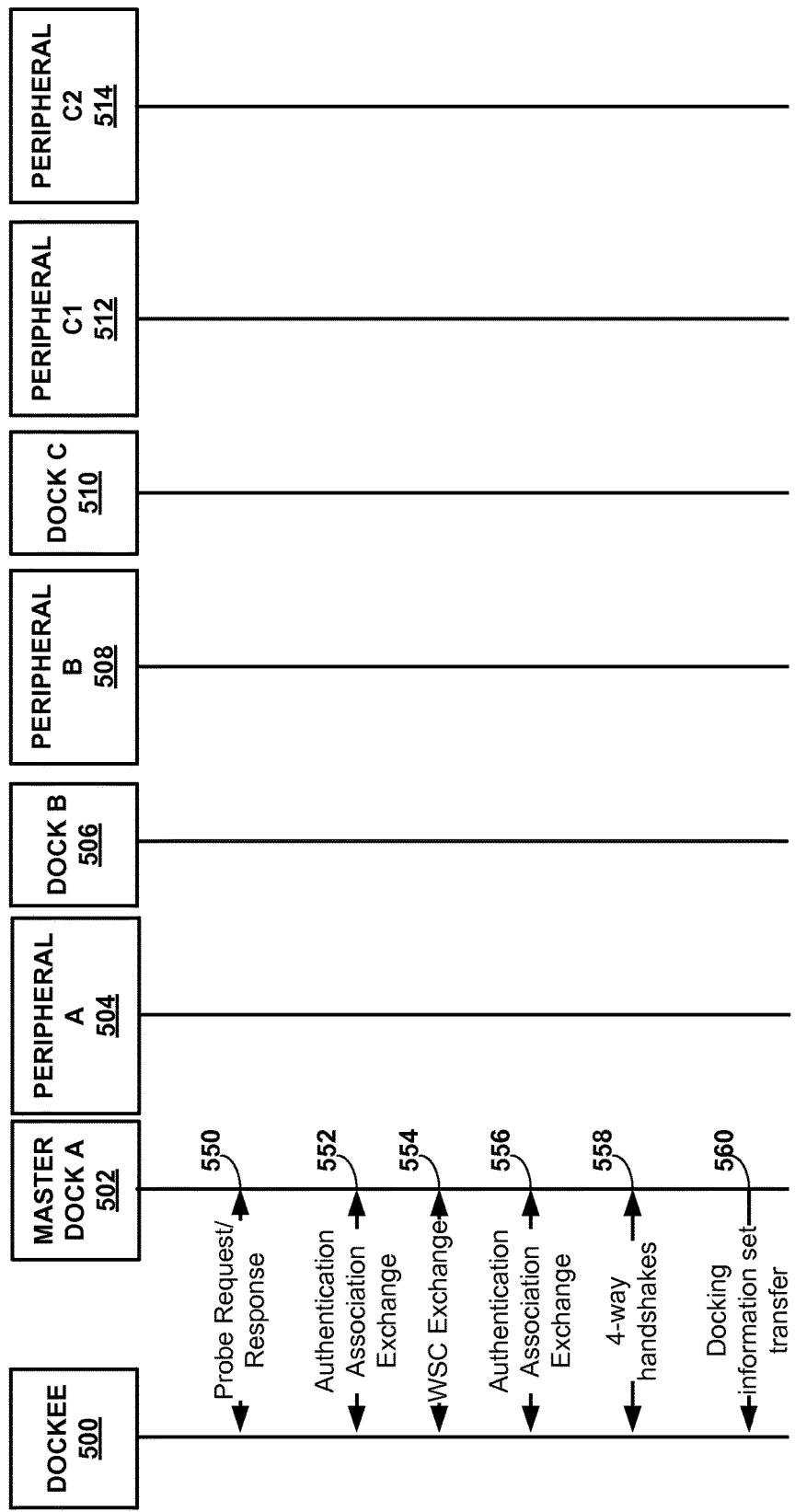

FIGS. 5A-5C are communication diagrams illustrating an example docking station group forming and advertising procedure in accordance with one or more examples of this disclosure. The docking station group forming and advertising procedure provides for the initial set up to start a docking environment. This environment may then be advertise to a dockee, such as handset 202.

In an example, device information may be enclosed in a Wireless Docking Information Element (WD IE), when devices discover one another. Wireless docking protocol communication may be based on the use of Wireless Docking Information Element Wireless Docking Action frame and Wireless Docking Public Action frame formats. In various examples, the Wireless Docking Information Element (WD IE) may be sent within a Beacon Frame, a Probe Request/Response Frame, Wireless Docking Public Action Frame, and Wireless Docking Action frame. When a WD IE is sent within a Beacon Frame, a Probe Request/Response Frame, or a Wireless Docking Public Action Frame, the device information may be enclosed to identify the basic operational information of a docking station and to facilitate the docking group formation among docking stations and docking group presentation to a dockee.

In an example, device information may include (1) the capability to support wireless docking, (2) the state of the docking station in the docking environment (whether has joined a docking group), (3) the role of the docking station in the docking group (the master docking station or a regular dock), (4) docking group ID, and (5) capability to support relaying and others.

When a WD IE is sent within a Wireless Docking Action frame, a docking information set should be enclosed to facilitate docking group presentation to a dockee and allow a dockee to pair with the individual docking stations and peripherals. In some examples, one docking information set may be provided for each dock. In an example, a docking information set may include (1) docking station device address, (2) password information for each docking station to be used for pairing the dock, (3) protocol and port number for pairing, (4) available peripherals device types, and (5) available interface technologies for each peripherals device type.

A wide variety of different types of information may be transferred between docking stations such as master dock 502 and dock B 506 and dock C 510. An example may provide for direct transfer of information, such as (1) originator's device address, (2) originator's peripheral identity, (3) originator's password for the WSC procedure, (4) terminator's device address, and (5) terminator's device identity. In some examples, device address may be the address in the MAC layer. Peripheral identity may be the peripheral function identification number in the docking protocol layer. Generally, there may be a plural of peripheral functions associated with an originator and a terminator.

As illustrated in FIGS. 5A-5C, the conceptual diagram illustrating an example docking station group forming and advertising procedure includes a dockee 500, master dock A 502, peripheral A 504, dock B 506, peripheral B 508, dock C 510, peripheral C1 512 and peripheral C2 514. Dockee 500 may be, for example, a handset 202. Master dock A 502 may be connected to peripheral A 504. Dock B 506 may be connected to peripheral B 508. Dock C 510 may be connected to two peripheral, peripherals C1 512 and C2 514. In the illustrated example, master dock A 502 may be connected to peripheral A 504, dock B 506 may be connected to peripheral B 508, and dock C 510 may be connected to peripheral C1 512 using a wire line. Dock C 510 may be connected to peripheral C2 514 through wireless.

Additionally, as illustrated in FIG. 5A, master dock A 502 may form a group by exchanging information with dock B 506. Master dock A 502 may send a probe request to dock B 506 and dock B 506 may send a response back to master dock 502 (520). Master dock A 502 and dock B 506 may then have a GO negotiated exchange (522) followed by an authentication/association exchange (524), a Wi-Fi Simple Configuration (WSC) exchange (525), and another authentication/association exchange (528). A 4-way handshake may then occur (530) followed by a docking information set transfer (532). For example, at docking information set transfer, dock B 506 may transmit its docking station device address, password information for each docking station to be used for pairing the dock, protocol and port number for pairing, available peripherals device types, and available interface technologies for each peripherals device type.

As illustrated in FIG. 5B, master dock A 502 may form further expand the group by exchanging information with dock C 510. Master dock A 502 may send a probe request to dock C 510 and dock C 510 may send a response back to master dock 502 (534). Master dock A 502 may then transmit an invitation request to dock C 510 (536) and dock C 510 may transmit an invitation response back to master dock A 502 (538). This may be followed by an authentication/association exchange (540), a WSC exchange (542), and another authentication/association exchange (544). A 4-way handshake may then occur (546) followed by a docking information set transfer (548).

As illustrated in FIG. 5C, master dock A 502 may add a dockee 500 to the group by exchanging information with dockee 500. Master dock A 502 may send a probe request to dockee 500 and dockee 500 may send a response back to master dock 502 (550). Master dock A 502 and dockee 500 may then have an authentication/association exchange (552), a WSC exchange (556), and another authentication/association exchange (556). A 4-way handshake may then occur (558) followed by a docking information set transfer (560).

Figure 6A:
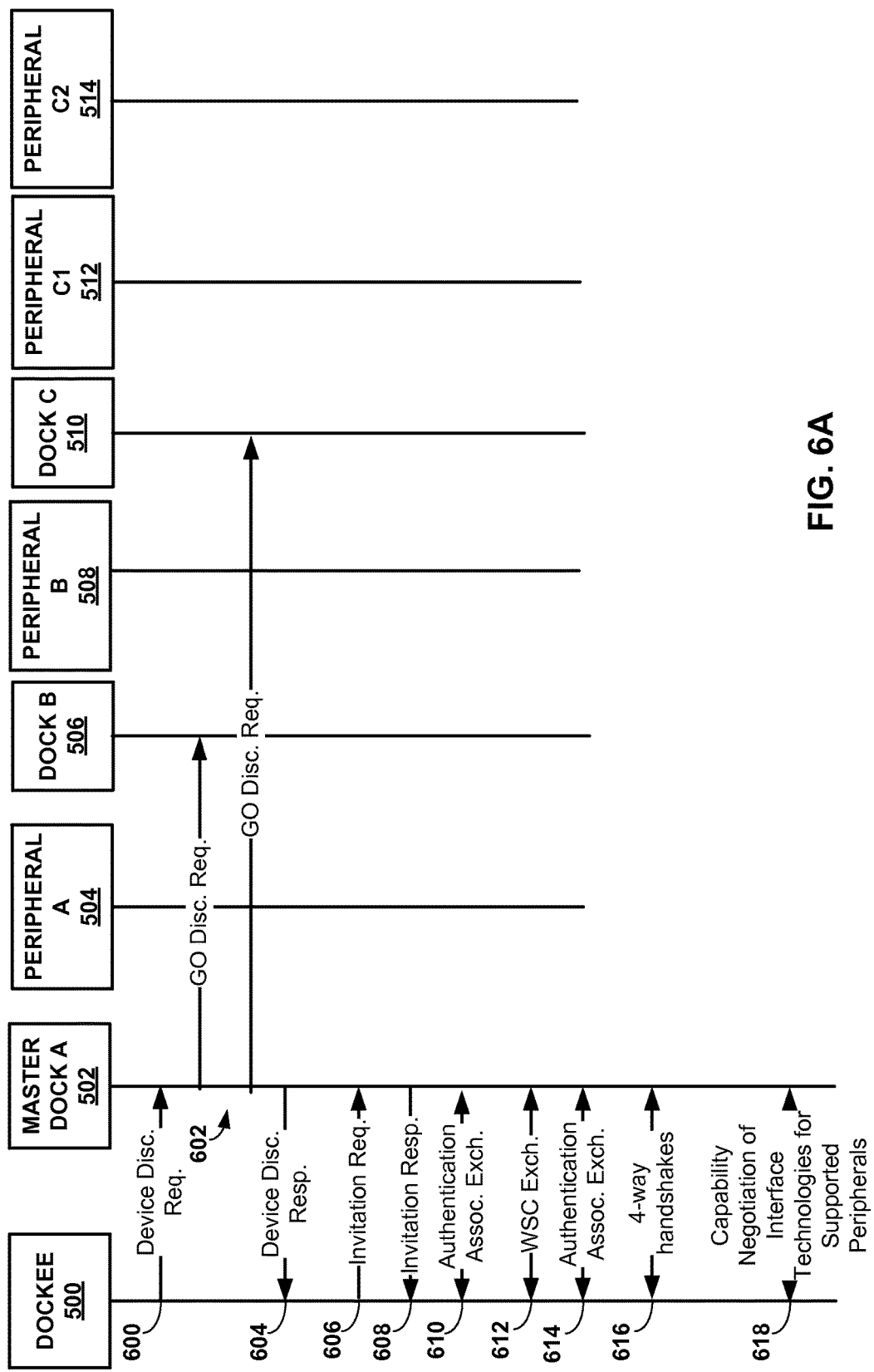
FIG. 6A-6C are communication diagrams illustrating an example pairing procedure in accordance with one or more examples of this disclosure.
Figure 6B:
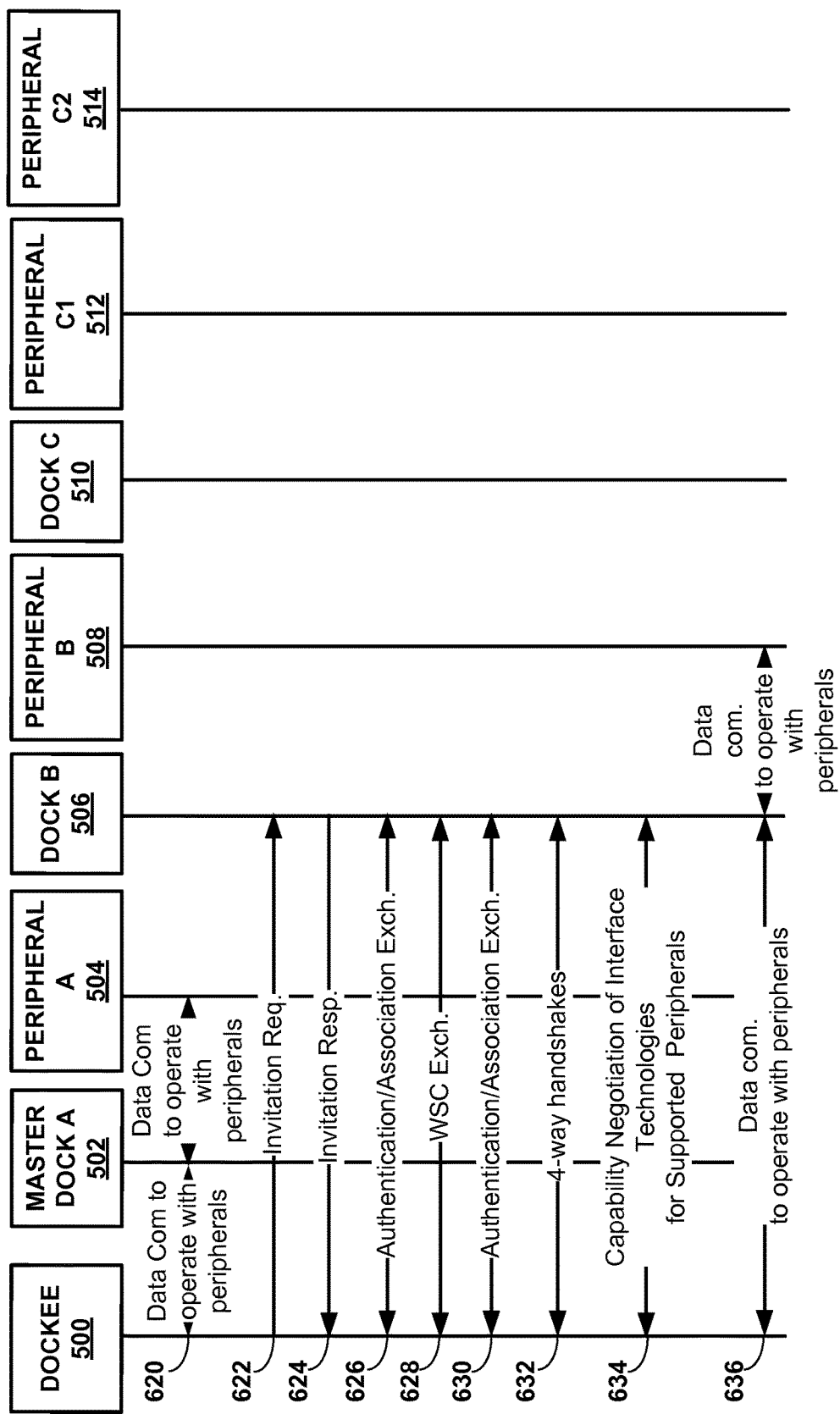
Figure 6C:
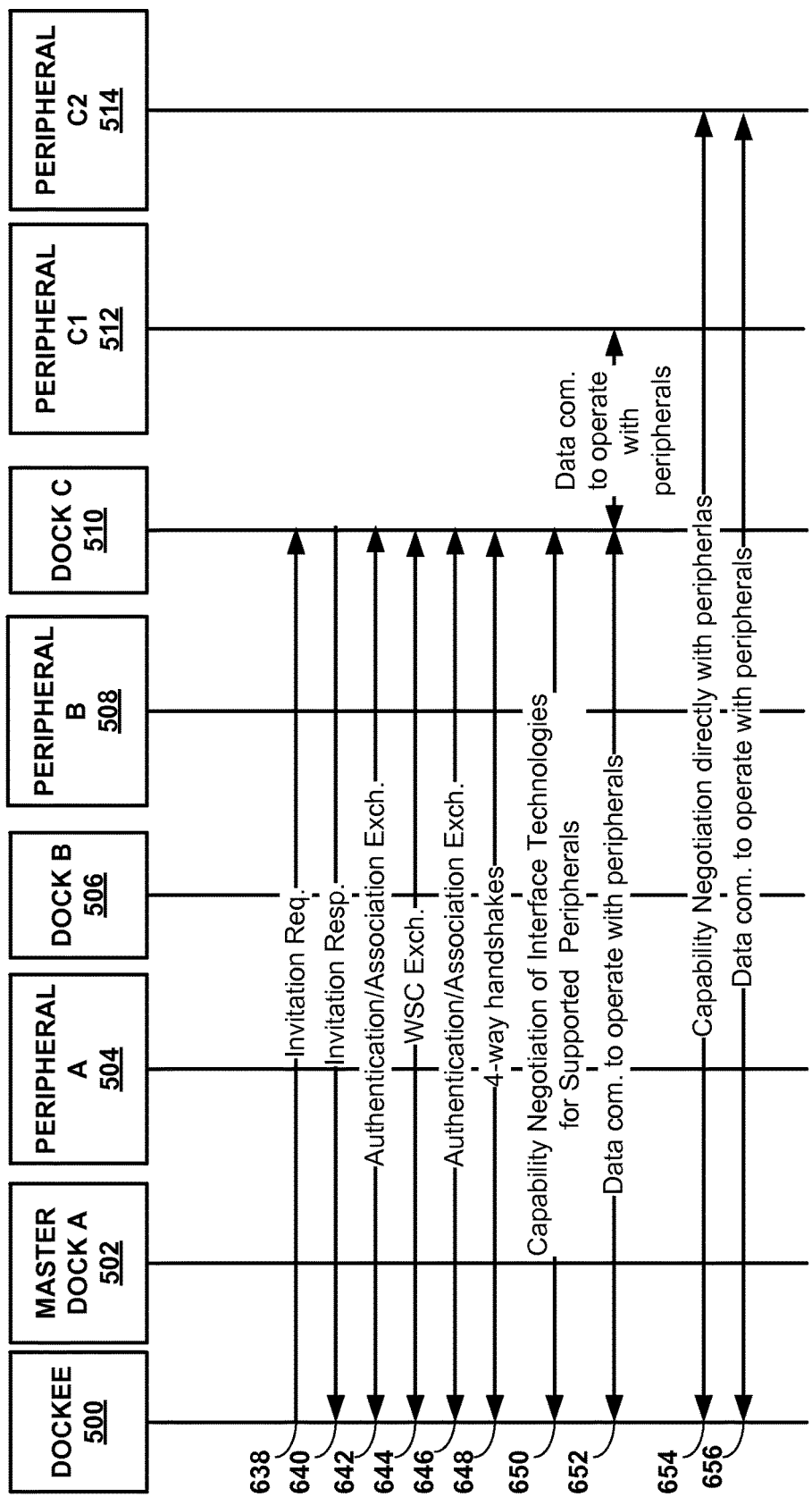

FIGS. 6A-6C are communication diagrams illustrating an example pairing procedure in accordance with one or more examples of this disclosure. In the illustrated example of FIGS. 6A-6C, a pairing procedure may be used for a dockee to pair with docking stations and individual peripherals. In some examples, a docking information set may be sent via a protocol over IP or within Wi-Fi peer-to-peer L2.

For example, a mobile device may include a processor and a memory, coupled to the processor. The memory may store instructions causing the processor to (1) connect to a master docking station which is a layer 2 peer-to-peer group owner, the layer 2 peer-to-peer group including a second docking station and (2) retrieve information from the second dock. After the mobile device retrieves the information it can directly connect to the second docking station and use a peripheral that is directly connected to the second docking station.

As illustrated in FIG. 6A, dockee 500 may send a device discovery request to master dock A 502 (600). Master dock 502 may in turn send GO discovery requests to each dock, e.g., dock B 506 and dock C 510, in the group (602). Master dock A 502 may then send a device discovery response (604) to dockee 500.

In the example of FIG. 6A, dockee 500 transmits an invitation request to master dock A 504 (606) and master dock A 502 may respond with an invitation response (608). Master dock A 502 and dockee 500 may then have an authentication/association exchange (610), a WSC exchange (612), and another authentication/association exchange (614). A 4-way handshake may then occur (616). Master dock A 502 and dockee 500 may also have a negotiation to determine capability of interface technologies for supported peripherals (618). In this way the interface technologies available to dockee 500 and various docks 502, 506, 510, and various peripherals 504, 508, 512, 514 connected to the peripherals might be exchanged between devices so that the devices may communicate with one another, for example, the peripheral 504 connected to dock A 502 might be able to be used by dockee 500.

FIG. 6B illustrates that dockee 500, master dock A 502 and peripheral A 504 may transmit and receive data from each other (620). Additionally, FIG. 6B illustrates pairing between dockee 500 and dock B 506. Dockee 500 transmits an invitation request to dock B 506 (622) and dock B 506 may respond with an invitation response (624). Dock B 506 and dockee 500 may then have an authentication/association exchange (626), a WSC exchange (628), and another authentication/association exchange (630). A 4-way handshake may then occur (632). Dock B 506 and dockee 500 may also have a negotiation to determine capability of interface technologies for supported peripherals (634). In this way the interface technologies available to dockee 500 and dock 506 and various peripheral B 508, connected to dock B 506 might be exchanged between the devices so that the devices may communicate with one another. Dockee 500, dock B 506 and peripheral B 508 may transmit and receive data from each other (636).

FIG. 6C illustrates pairing between dockee 500 and dock C 510. Dockee 500 transmits an invitation request to dock C 5510 (638) and dock C 510 may respond with an invitation response (640). Dock C 510 and dockee 500 may then have an authentication/association exchange (642), a WSC exchange (644), and another authentication/association exchange (646). A 4-way handshake may then occur (648).

Dock C 510 and dockee 500 may also have a negotiation with dock C 510 to determine capability of interface technologies for supported peripherals (650). In this way the interface technologies available to dockee 500 and dock 506 and peripheral C1 512, connected to dock C 510 might be exchanged between the devices so that the devices may communicate with one another. Dockee 500, dock C 510 and peripheral C1 512 may then transmit and receive data from each other (652).

Dockee 500 may also have a negotiation directly with, for example, peripheral C2, to determine capability of interface technologies for supported peripherals (654) Dockee 500 and peripheral C2 514 may then transmit and receive data directly from each other (656).

In an example, a peripheral may include a processor and a memory, coupled to the processor. The memory may store instructions causing the processor to: (1) identify the peripheral to a mobile device, (2) transmit information describing the peripheral to the mobile device, (3) receive information describing a second peripheral from the mobile device, and (4) communicate directly with the second peripheral based on the information describing the peripheral and the information describing the second peripheral received from the mobile device.

Figure 7A:
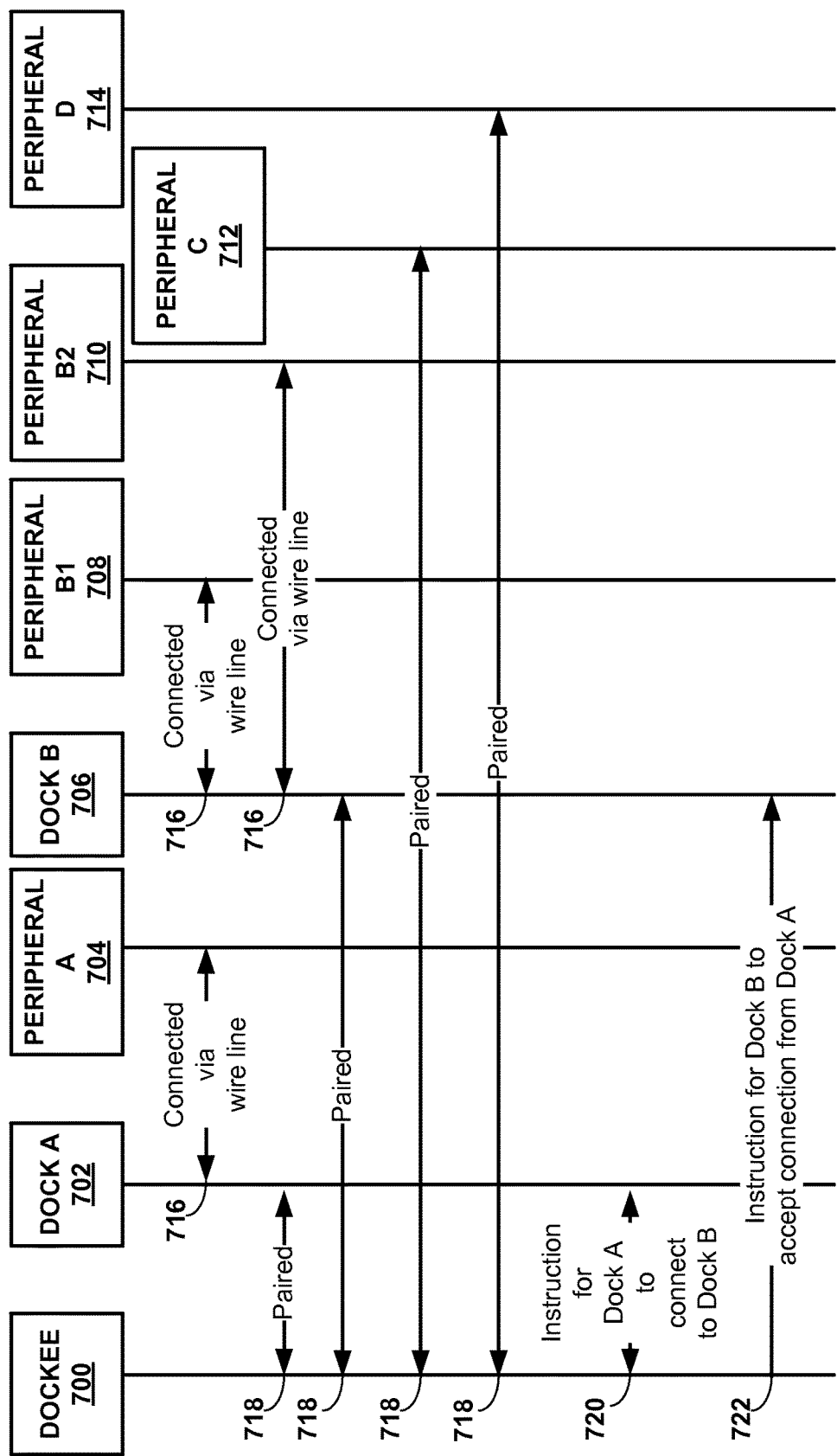
FIG. 7A-7C are communication diagrams illustrating an example Direct Data Transfer (DDT) instruction procedure in accordance with one or more examples of this disclosure.
Figure 7B:
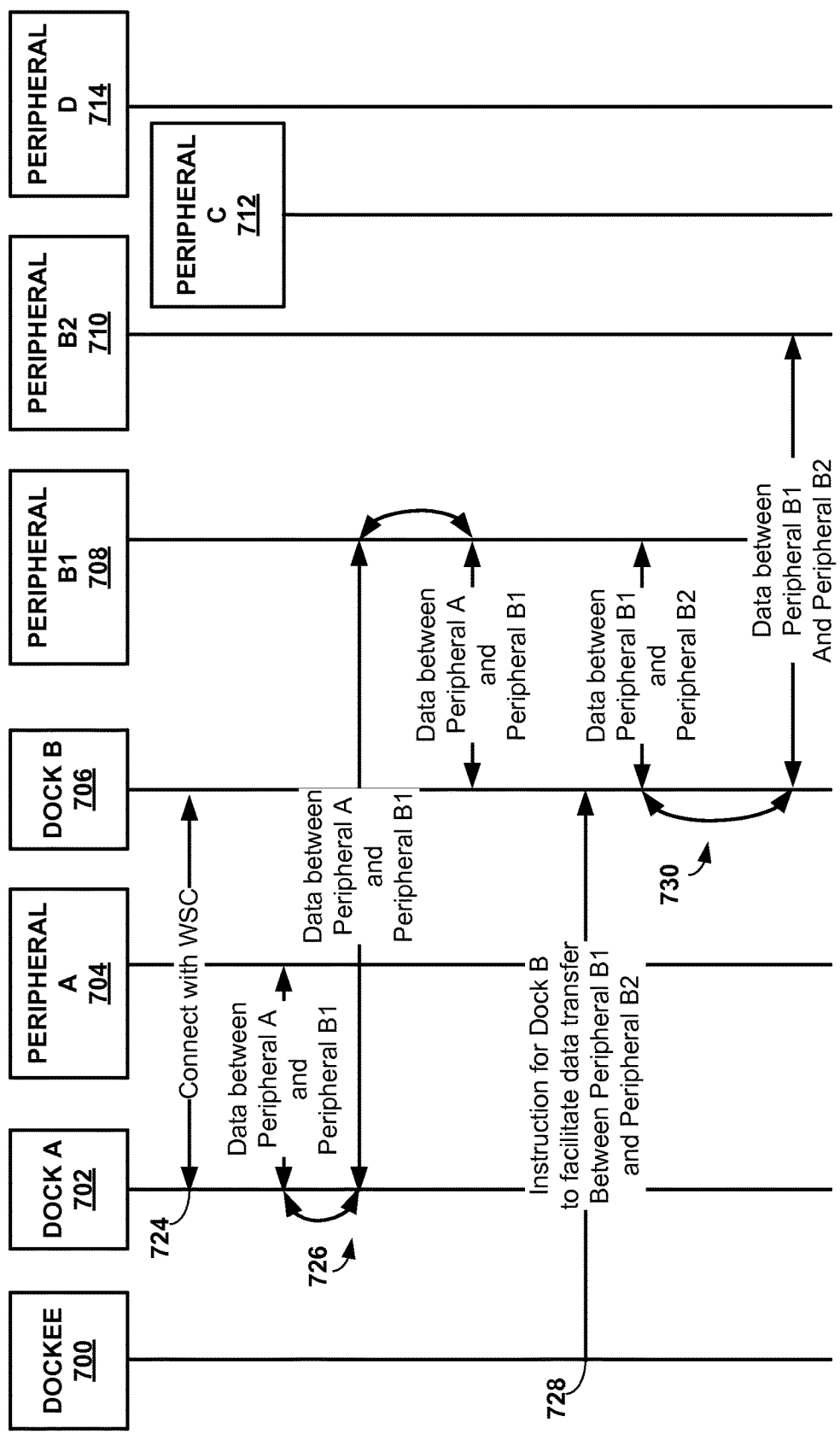
Figure 7C:
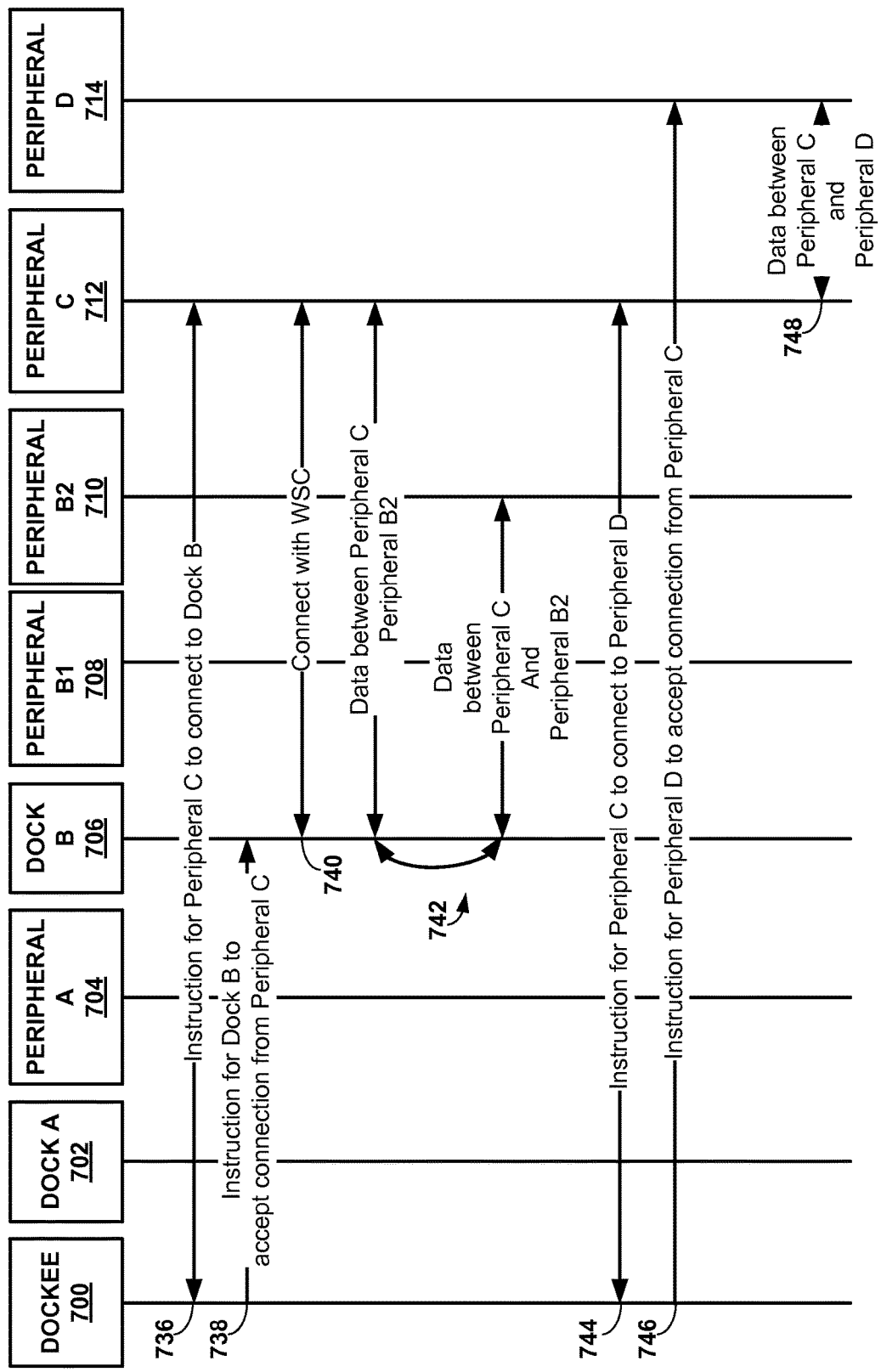

FIGS. 7A-7C are communication diagrams illustrating an example Direct Data Transfer (DDT) instruction procedure in accordance with one or more examples of this disclosure. The DDT instruction procedure may be used for a dockee 700 to instruct a direct data transfer between docking stations (docks 702, 706) and peripherals 704, 708, 710, 712, 714. Direct transfer information may be enclosed in the WD IE, when a dockee 700 gives DDT instructions to docking stations or peripherals as illustrated in FIGS. 7A-7C. The direct transfer information may be enclosed in a wireless docking information element.

As illustrated in FIG. 7A, dock A 702 and peripheral A 704 may be connected via a wire line (716). Similarly, dock B 706 and peripheral B1 708 and peripheral B2 710 may also be connected via wire lines (716). In the illustrated example dockee 700 may be paired with dock A 702, dock B 706, peripheral C 712 and peripheral D 714 (718). This group of pairings will allow dockee 700 to have access to all peripherals 704, 708, 710, 712, 714. Dockee 700 may access peripheral A 704 through dock A 702, peripheral B1 708 and peripheral B2 710 through dock B 706. Dockee 700 may access peripheral C 712 and peripheral D 714 directly. Dockee 700 may instruct dock A 702 to connect to dock B 706 (720) and may instruct dock B 706 to accept the connection from dock A (722).

As illustrated in FIG. 7B, dock A 702 and dock B 706 may connect with WSC (724). Additionally, data may be transmitted between dock A 702 and peripheral A (704) as well as between dock A 702 and peripheral B1 708 (728) and dock B 706 (730). In this way, data may be transmitted between peripheral A 704 and peripheral B1 708.

As illustrated in FIG. 7C, dockee 700 and peripheral C 714 may exchange data, e.g., one or more instructions, for peripheral C 712 to connect to dock B 706 (736). Dockee 700 may also instruct dock B to accept a connection from peripheral C 712 (738). Accordingly, dock B 706 may connect with peripheral C 712, for example, using WSC (740). With dock B 706 and peripheral C connected, data may be transmitted between peripheral B2 710 and peripheral C 712 (740) through dock B 706 (742).

In an example, data may be transferred between peripheral C 712 and peripheral D 714 directly. An instruction from dockee 700 to dock C 712 may be sent to facilitate a data transfer between peripheral C 712 and peripheral D 714 (744). An instruction from dockee 700 to dock D 714 may be sent by the dockee to instruct peripheral D 714 to accept a connection from peripheral C 712 (746). Data may then be exchanged between peripheral C 712 and peripheral D 714 (748).

A mobile device may include a processor and a memory, coupled to the processor. The memory may store instructions causing the processor to: (1) identify a first peripheral and a second peripheral, (2) receive information from the first peripheral and the second peripheral, (3) communicate the information received from the first peripheral to the second peripheral, and (4) communicate the information received from the second peripheral to the first peripheral. The information communicated to the first and second peripherals allow the first and second peripherals to communicate directly with one another. In some examples, the information communicated may cause the first and second peripherals 112, 114 to communicate directly with one another.

Figure 8:
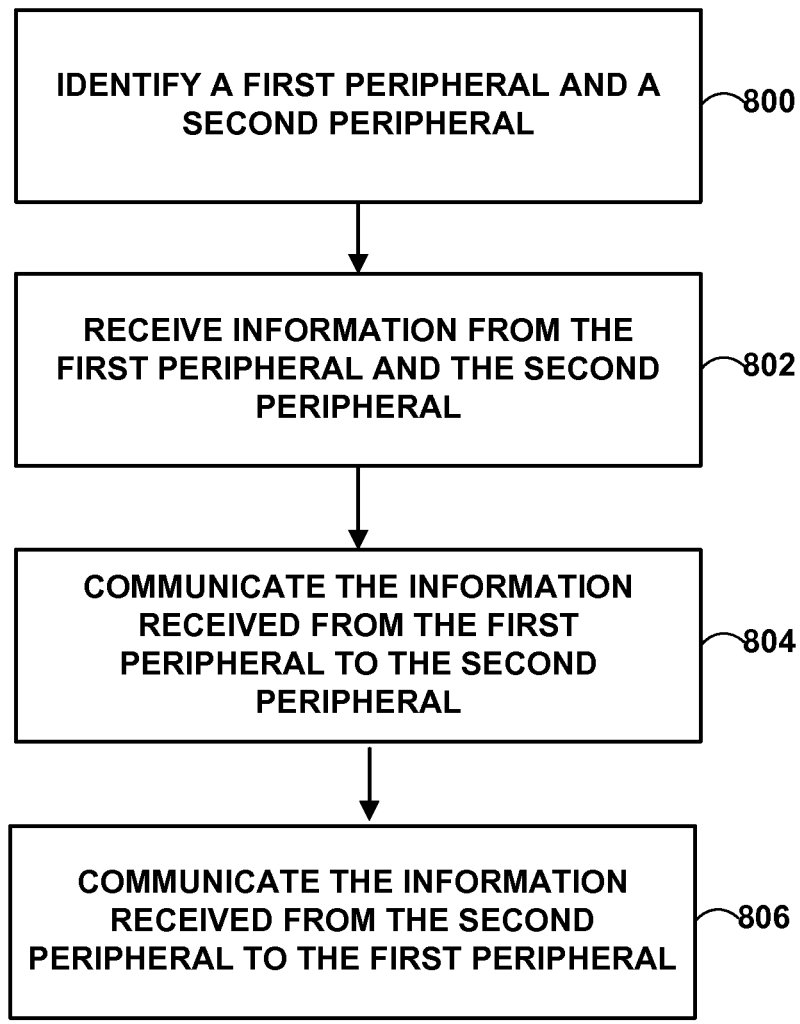
FIG. 8 is a flowchart illustrating an example method in accordance with one or more examples of this disclosure.

FIG. 8 is a flowchart illustrating an example method in accordance with one or more examples of this disclosure. In one example, a mobile device may include a processor and a memory coupled to the processor. The memory may store instructions causing the processor to identify a first peripheral and a second peripheral (800). The instructions may further cause the processor to receive information from the first peripheral and the second peripheral (802). The instructions may also cause the processor to communicate the information received from the first peripheral to the second peripheral (804). The instructions may cause the processor to communicate the information received from the second peripheral to the first peripheral (806). In an example, the information communicated to the first and second peripherals allow the first and second peripherals to communicate directly with one another. In some examples, the information communicated may cause the first and second peripherals 112, 114 to communicate directly with one another.

In some examples, the memory further includes instructions causing the mobile device to communicate with at least one of the first peripheral and the second peripheral directly. In other examples, instructions causing the processor to cause a communication between the mobile device and a master docking station. This may be accomplished through the master docking station or through the master docking station and a second docking station.

Figure 9:
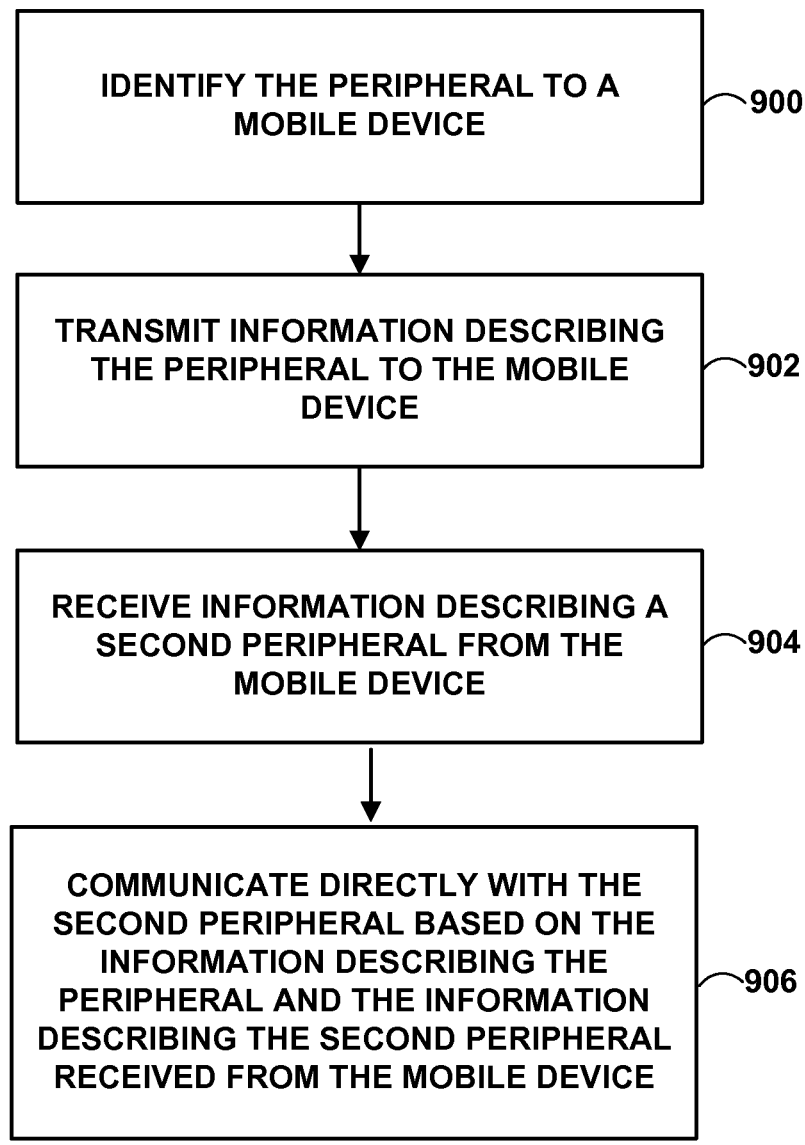
FIG. 9 is another flowchart illustrating an example method in accordance with one or more examples of this disclosure.

FIG. 9 is a flowchart illustrating an example method in accordance with one or more examples of this disclosure. In one example, a peripheral may include a processor and a memory coupled to the processor. The memory may store instructions causing the processor to identify the peripheral to a mobile device (900). The instructions may further cause the processor to transmit information describing the peripheral to the mobile device (902). The instructions may also cause the processor to receive information describing a second peripheral from the mobile device (904). The instructions may also cause the processor to communicate directly with the second peripheral based on the information describing the peripheral and the information describing the second peripheral received from the mobile device (906). In some examples, the instructions may cause the mobile device to communicate with at least one of the first peripheral and the second peripheral directly. In another example, the instructions may cause the peripheral to communicate with the mobile device and the second peripheral through a master docking station or through a master docking station and a second docking station.

Figure 10:
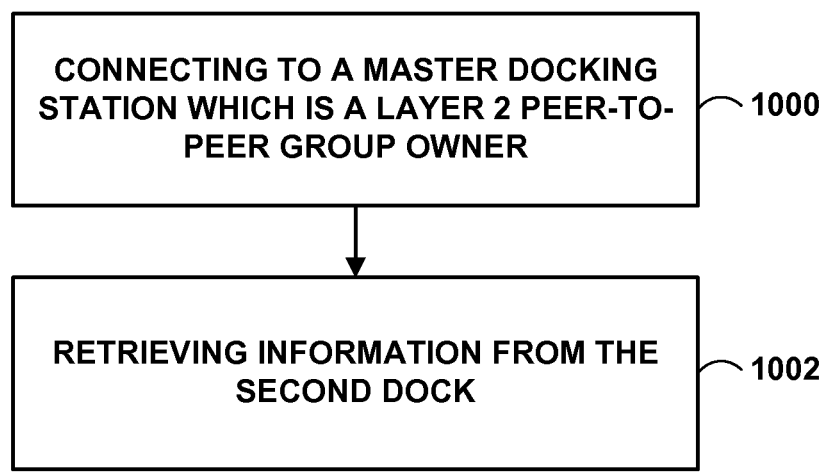
FIG. 10 is another flowchart illustrating an example method in accordance with one or more examples of this disclosure.

FIG. 10 is another flowchart illustrating an example method in accordance with one or more examples of this disclosure. In one example, a mobile device may include a processor and a memory coupled to the processor. The memory may store instructions causing the processor to connect to a master docking station, which is a layer 2 peer-to-peer group owner (1000). The layer 2 peer-to-peer group may include additional docking stations. In one example, the layer 2 peer-to-peer group includes a second docking station. For example, the topology of such a network may allow for multiple docking stations 102, 104, 106 with each docking station 102, 104, 106 having several peripherals to form the peer-to-peer group. Some example systems may include master docking station 102 and docking stations 104, 106 to form the layer 2 Wi-Fi peer-to-peer group. The docking stations 104, 106 do not necessarily have access to each other 104, 106, but master docking station 102 has access to each docking station 104, 106.

The instructions may further cause the processor to retrieve information from the second docking station (1002). In some examples, after the mobile device retrieves the information it can directly connect to the second docking station and use a peripheral that is directly connected to the second docking station.

Figure 11:
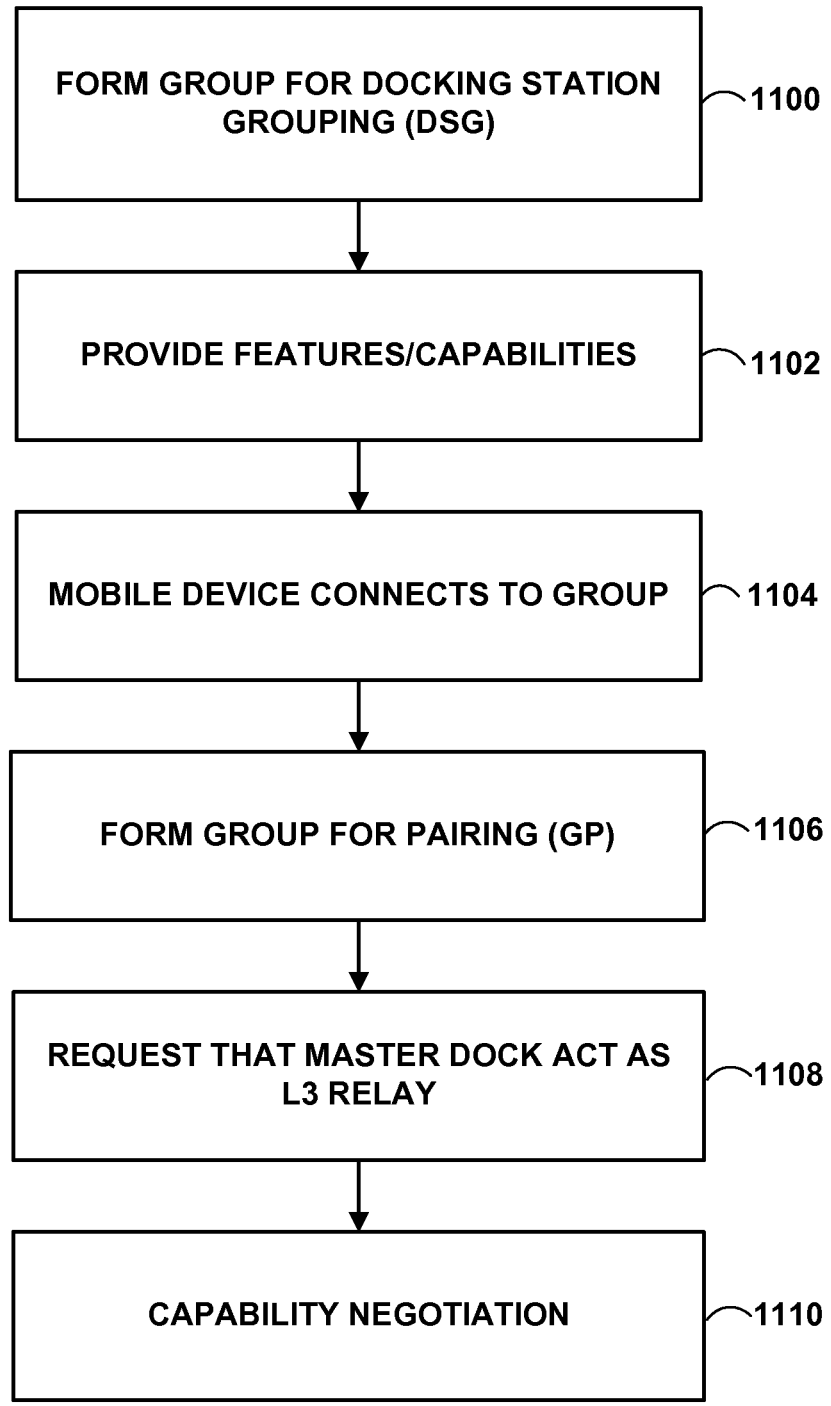
FIG. 11 is another flowchart illustrating an example method in accordance with one or more examples of this disclosure.

FIG. 11 is another flowchart illustrating an example method in accordance with one or more examples of this disclosure. A group of docks 502, 506, 510 may form a persistent Wi-Fi Direct group, which may be referred to as a GDG (1100). As part of forming the GDG each docking station 502, 506, 510 may collected information for peripherals 504, 508, 512, 514 that are connected to it. For example, master dock A 502 may have peripheral A 504 connected to it. Dock B 506 may have peripheral B 508 connected to it and dock C 510 may have peripheral C1 512 and peripheral C2 514 connected to it. Peripherals 504, 508, 512 may be to docks 502, 506, 510 by wire lines in some examples. In other examples, peripheral C2 514 may be connected to dock C 510 wirelessly. For peripherals connected wirelessly a discovered procedure for discovering those peripherals wirelessly may be used.

Docking stations 502, 506, 510 may discover one another using the device discovery procedure of Wi-Fi Direct to form the GDG. Each dock 502, 506, 510 may be one of multiple docks with the group owner is identified as the master dock, e.g., master dock A 502. WSC may be used for securing communications between the master docking station and all the other docks.

All docking stations 502, 506, 510 may provide their docking features and/or wireless docking capability information to the master dock (master dock A 502). This information may including docking station 502, 506, 510 peripherals such as mouse, display, storage, sensors, etc. (1102). Information provided may also include available docking interfaces for each peripheral (e.g., WFD, WSB-L2, WSB-IP, USB/IP, WiGig, to name a few).

A mobile device (dockee 500) may connect to the GDG (1104). For example a mobile telephone handset may discover and connect to the master docking station with WSC. The master docking station may then present docking features of each docking station to the handset, including (1) device address, (2) peripherals of each dock, and (3) available docking interfaces for each peripheral.

The devices may form a GP. The GP is a persistent Wi-Fi direct group between a handset and all docks (1106). The master docking station gives the password of each docking station in GDG to the handset so that the handset can assume the role of the WSC registrar as a group owner for GP. The handset may then assume the group owner role. Accordingly, the handset may request the master docking station to enable the discoverability of other docking stations in GDG. The handset invites all docking stations including the master docking station to join GP. Additionally, all docking stations may join GP with WSC. In some examples, the master docking station gives the password of each docking station in GDG to the handset so that the handset can assume the role of the WSC registrar as a group owner for GP.

In some examples, a dockee 500 such as a mobile telephone handset may request the master docking station to be a L3 relay (1108). For example, those docking stations that the handset cannot connect successfully, the handset may request the master docking station to be a L3 relay. The master docking station can play the role of a relay as it is a group client of GP and at the same time a group owner of GDG. This step is optional in some examples implementing the techniques of this disclosure.

The devices may perform a capacity negotiation (1110). For example, the handset may identify the feature, for example, the combination of docking interface and their supported peripherals, that the handset might use. The handset may perform the capability negotiation with the corresponding docking station or directly with the corresponding peripheral for the feature it would like to use. Additionally, the capability negotiation procedure for existing interface technologies (WFD, WSB, WiGig) are defined by the corresponding specifications. In another example, the handset negotiates a feature set with each dock, including (1) supported docking feature (e.g., WFD, WSB-L2, WSB-IP, WiGig) and (2) supported peripheral types (mouse, display, storage, sensor).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A mobile device comprising:
a wireless interface; and
a processor, connected to the wireless interface, wherein the processor is configured to:
connect to a master docking station via a wireless interface using a first wireless technology;
receive an environment from the master docking station using the first wireless technology;
identify a first peripheral and a second peripheral using the received environment;
receive information about the first peripheral from the master docking station via the wireless interface using the first wireless technology, the information describing the first peripheral, indicating a second wireless technology used by the first peripheral, and including interface credentials for the first peripheral;
receive information about the second peripheral from the master docking station via the wireless interface using the first wireless technology, the information describing the second peripheral, indicating a third wireless technology used by the second peripheral, and including interface credentials for the second peripheral;
communicate the information received about the first peripheral directly to the second peripheral via the wireless interface using the third wireless technology; and
communicate the information received about the second peripheral directly to the first peripheral via the wireless interface using the second wireless technology,
wherein the information communicated to the first peripheral and the second peripheral causes the first peripheral and the second peripheral to communicate directly with one another and to respond to direct data transfer instruction procedures from the mobile device to perform a direct data transfer between the first peripheral and the second peripheral responsive to direct data transfer instructions from the mobile device.

2. The mobile device of claim 1, wherein the information communicated to the first peripheral comprises pairing information associated with the second peripheral, and the information communicated to the second peripheral comprises pairing information associated with the first peripheral.

3. The mobile device of claim 1, wherein the processor is further configured to negotiate the use of the first wireless technology with the master docking station.

4. The mobile device of claim 1, wherein the second peripheral is connected to a second docking station, the first peripheral is connected to the master docking station, the master docking station is connected to the second docking station, and the processor is further configured to communicate directly with the master docking station, and the processor is unable to communicate directly with the second docking station.

5. The mobile device of claim 1, wherein the processor is further configured to communicate with at least one of the first peripheral and the second peripheral through the master docking station.

6. The mobile device of claim 1, wherein the processor is further configured to communicate with at least one of the first peripheral and the second peripheral through a data path between both the master docking station and a second docking station.

7. The mobile device of claim 1, wherein the mobile device comprises a mobile telephone handset, a laptop computer, or a tablet computer.

8. The mobile device of claim 1, wherein the information comprises (1) port number, (2) transport layer, (3) USB device identification, and (4) USB endpoint identification.

9. The mobile device of claim 1, wherein the information is selected from the group consisting of (1) port number, (2) transport layer, (3) USB device identification, and (4) USB endpoint identification.

10. A method comprising:
connecting, by a mobile device, to a master docking station via a wireless interface using a first wireless technology;
receiving, at the mobile device, an environment from the master docking station using the first wireless technology;
identifying, by the mobile device, a first peripheral and a second peripheral using the received environment;

receiving, at the mobile device and via the wireless interface using the first wireless technology, information about the first peripheral from the master docking station, the information describing the first peripheral, indicating a second wireless technology used by the first peripheral, and including interface credentials for the first peripheral;

receiving, at the mobile device and via the wireless interface using the first wireless technology, information about the second peripheral from the master docking station, the information describing the second peripheral, indicating a third wireless technology used by the second peripheral, and including interface credentials for the second peripheral;

communicating the information received about the first peripheral directly from the mobile device to the second peripheral using the third wireless technology; and communicating the information received about the second peripheral directly from the mobile device to the first peripheral using the second wireless technology, wherein the information communicated to the first peripheral and the second peripheral causes the first peripheral and the second peripheral to communicate directly with one another and to respond to direct data transfer instruction procedures from the mobile device to perform a direct data transfer between the first peripheral and the second peripheral responsive to direct data transfer instructions from the mobile device.

11. The method of claim 10, wherein the information communicated to the first peripheral comprises pairing information associated with the second peripheral, and the information communicated to the second peripheral comprises pairing information associated with the first peripheral.

12. The method of claim 10, further comprising negotiating the use of the first wireless technology with the master docking station.

13. The method of claim 10, wherein the second peripheral is connected to a second docking station, the first peripheral is connected to the master docking station, the master docking station is connected to the second docking station, and further wherein the mobile device is able to communicate directly with the master docking station and is unable to communicate directly with the second docking station.

14. The method of claim 10, further comprising communicating with at least one of the first peripheral and the second peripheral through the master docking station.

15. The method of claim 10, further comprising communicating with at least one of the first peripheral and the second peripheral through a data path between both the master docking station and a second docking station.

16. The method of claim 10, wherein the information comprises (1) port number, (2) transport layer, (3) USB device identification, and (4) USB endpoint identification.

17. The method of claim 10, wherein the information is selected from the group consisting of (1) port number, (2) transport layer, (3) USB device identification, and (4) USB endpoint identification.

18. A mobile device comprising:
means for connecting to a master docking station via a wireless interface using a first wireless technology;
means for receiving an environment from the master docking station using the first wireless technology;
means for identifying a first peripheral and a second peripheral using the received environment;
means for receiving, via the wireless interface using the first wireless technology, information about the first peripheral from the master docking station, the information describing the first peripheral, indicating a second wireless technology used by the first peripheral, and including interface credentials for the first peripheral;
means for receiving, via the wireless interface using the first wireless technology, information about the second peripheral from the master docking station, the information describing the second peripheral, indicating a third wireless technology used by the second peripheral, and including interface credentials for the second peripheral;
means for communicating the information received about the first peripheral directly via the wireless interface to the second peripheral using the third wireless technology; and
means for communicating the information received about the second peripheral using the second wireless technology via the wireless interface to the first peripheral,
wherein the information communicated to the first peripheral and the second peripheral causes the first peripheral and the second peripheral to communicate directly with one another and to respond to direct data transfer instruction procedures from the mobile device to perform a direct data transfer between the first peripheral and the second peripheral responsive to direct data transfer instructions from the mobile device.

19. The device of claim 18, wherein the information describing the first peripheral comprises pairing information associated with the second peripheral, and the information describing the second peripheral comprises pairing information associated with the first peripheral.

20. The device of claim 18, wherein the information comprises (1) port number, (2) transport layer, (3) USB device identification, and (4) USB endpoint identification.

21. The device of claim 18, wherein the information wherein the information is selected from the group consisting of (1) port number, (2) transport layer, (3) USB device identification, and (4) USB endpoint identification.

22. A computer program product comprising a computer-readable storage medium having stored thereon instructions that, when executed, cause a processor on a mobile device to:
connect to a master docking station via a wireless interface using a first wireless technology;
receive an environment from the master docking station using the first wireless technology;
identify a first peripheral and a second peripheral using the received environment;
receive information, at the mobile device and from the master docking station via the wireless interface using the first wireless technology, about the first peripheral, the information describing the first peripheral, indicating a second wireless technology used by the first peripheral, and including interface credentials for the first peripheral;
receive information, at the mobile device and from the master docking station via the wireless interface using the first wireless technology, about the second peripheral, the information describing the second peripheral, indicating a third wireless technology used by the second peripheral, and including interface credentials for the first peripheral;

communicate the information received about the first peripheral from the mobile device directly to the second peripheral using the third wireless technology; and communicate the information received about the second peripheral from the mobile device directly to the first peripheral using the second wireless technology, wherein the information communicated to the first peripheral and the second peripheral causes the first peripheral and the second peripheral to communicate directly with one another and to respond to direct data transfer instruction procedures from the mobile device to perform a direct data transfer between the first peripheral and the second peripheral responsive to direct data transfer instructions from the mobile device.

23. The computer program product of claim 22, wherein the information describing the first peripheral comprises pairing information associated with the second peripheral, and the information describing the second peripheral comprises pairing information associated with the first peripheral.

24. The computer program product of claim 22, wherein the instructions further cause the processor to communicate with the master docking station via the wireless interface.

25. The computer program product of claim 22, wherein the second peripheral is connected to a second docking station, the first peripheral is connected to the master docking station, the master docking station is connected to the second docking station, and further wherein the processor communicates directly with the master docking station, and the processor is unable to communicate directly with the second docking station.

26. The computer program product of claim 22, wherein the instructions further cause the processor to communicate with at least one of the first peripheral and the second peripheral through a data path between both the master docking station and a second docking station.

27. The computer program product of claim 22, wherein the information is selected from the group consisting of (1) port number, (2) transport layer, (3) USB device identification, and (4) USB endpoint identification.

* * * * *